United States Patent
Hitchcock et al.

(10) Patent No.: US 9,928,517 B1
(45) Date of Patent: Mar. 27, 2018

(54) INTERACTION RECONSTRUCTION IN A SERVICE-ORIENTED SYSTEM

(71) Applicant: Amazon Technologies, Inc., Reno, NV (US)

(72) Inventors: Daniel Wade Hitchcock, Bothell, WA (US); Anton Vladilenovich Goldberg, Bellevue, WA (US); James Daniel Longley, Seattle, WA (US); Brandon William Porter, Yarrow Point, WA (US)

(73) Assignee: Amazon Technologies, Inc., Reno, NV (US)

( * ) Notice: Subject to any disclaimer, the term of this patent is extended or adjusted under 35 U.S.C. 154(b) by 667 days.

(21) Appl. No.: 14/543,822

(22) Filed: Nov. 17, 2014

(51) Int. Cl.
- *G06F 11/34* (2006.01)
- *G06Q 30/02* (2012.01)
- *H04L 12/26* (2006.01)

(52) U.S. Cl.
CPC ..... *G06Q 30/0201* (2013.01); *G06F 11/3466* (2013.01); *G06F 11/3476* (2013.01); *H04L 43/045* (2013.01)

(58) Field of Classification Search
CPC . G06F 11/3476; G06F 11/3466; H04L 43/045
See application file for complete search history.

(56) References Cited

U.S. PATENT DOCUMENTS

| | | | |
|---|---|---|---|
| 5,809,121 A | 9/1998 | Elliott et al. | |
| 5,930,344 A | 7/1999 | Relyea et al. | |
| 7,209,548 B2 | 4/2007 | Ethier et al. | |
| 7,496,799 B2 | 2/2009 | Prang et al. | |
| 9,450,849 B1 * | 9/2016 | Goldberg | H04L 43/0876 |
| 9,559,928 B1 * | 1/2017 | Porter | G06F 11/3612 |
| 9,626,275 B1 * | 4/2017 | Hitchcock | G06F 11/3006 |
| 9,634,920 B1 * | 4/2017 | Goldberg | H04L 43/10 |
| 2005/0138111 A1 * | 6/2005 | Aton | G06F 11/3476 709/201 |
| 2005/0276388 A1 * | 12/2005 | Ethier | H04L 43/00 379/32.05 |

OTHER PUBLICATIONS

U.S. Appl. No. 14/543,826, filed Nov. 17, 2014, Anton Vladilenovich Goldberg.
"Dapper, a Large-Scale Distributed Systems Tracing Infrastructure", Benjamin H. Sigelman, et al., Apr. 2010, pp. 1-14.
X-Trace: A Pervasive Network Tracing Framework, Rodrigo Fonseca, et al. Apr. 2007, pp. 1-14.

* cited by examiner

*Primary Examiner* — Jeong S Park
(74) *Attorney, Agent, or Firm* — Robert C. Kowert; Meyertons, Hood, Kivlin, Kowert & Goetzel, P.C.

(57) ABSTRACT

Methods, systems, and computer-readable media for implementing interaction reconstruction in a service-oriented system are disclosed. Routes are stored for a first set of service interactions between individual services in a service-oriented system. The routes comprise data indicative of call paths for node identifiers in the first set of service interactions. A sparse trace is generated for a second set of service interactions between individual ones of the services. The sparse trace comprises a plurality of node identifiers in the second set of service interactions. Based on the node identifiers in the sparse trace and the node identifiers in the plurality of routes, the sparse trace is matched to one or more of the routes.

20 Claims, 21 Drawing Sheets

INTERACTION RECONSTRUCTION IN A SERVICE-ORIENTED SYSTEM

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

Web servers backed by distributed systems may provide marketplaces that offer goods and/or services for sale to consumers. For instance, consumers may visit a merchant's website to view and/or purchase goods and services offered for sale by the merchant (and/or third party merchants). Some network-based marketplaces (e.g., Internet-based marketplaces) include large electronic catalogues of items offered for sale. For each item offered for sale, such electronic catalogues typically include at least one product detail page (e.g., a web page) that specifies various information about the item, such as a description of the item, one or more pictures of the item, as well as specifications (e.g., weight, dimensions, capabilities) of the item. In various cases, such network-based marketplaces may rely on a service-oriented architecture to implement various business processes and other tasks. The service-oriented architecture may be implemented using a distributed system that includes many different computing resources and many different services that interact with one another, e.g., to produce a product detail page for consumption by a client of a web server.

Figure 1:
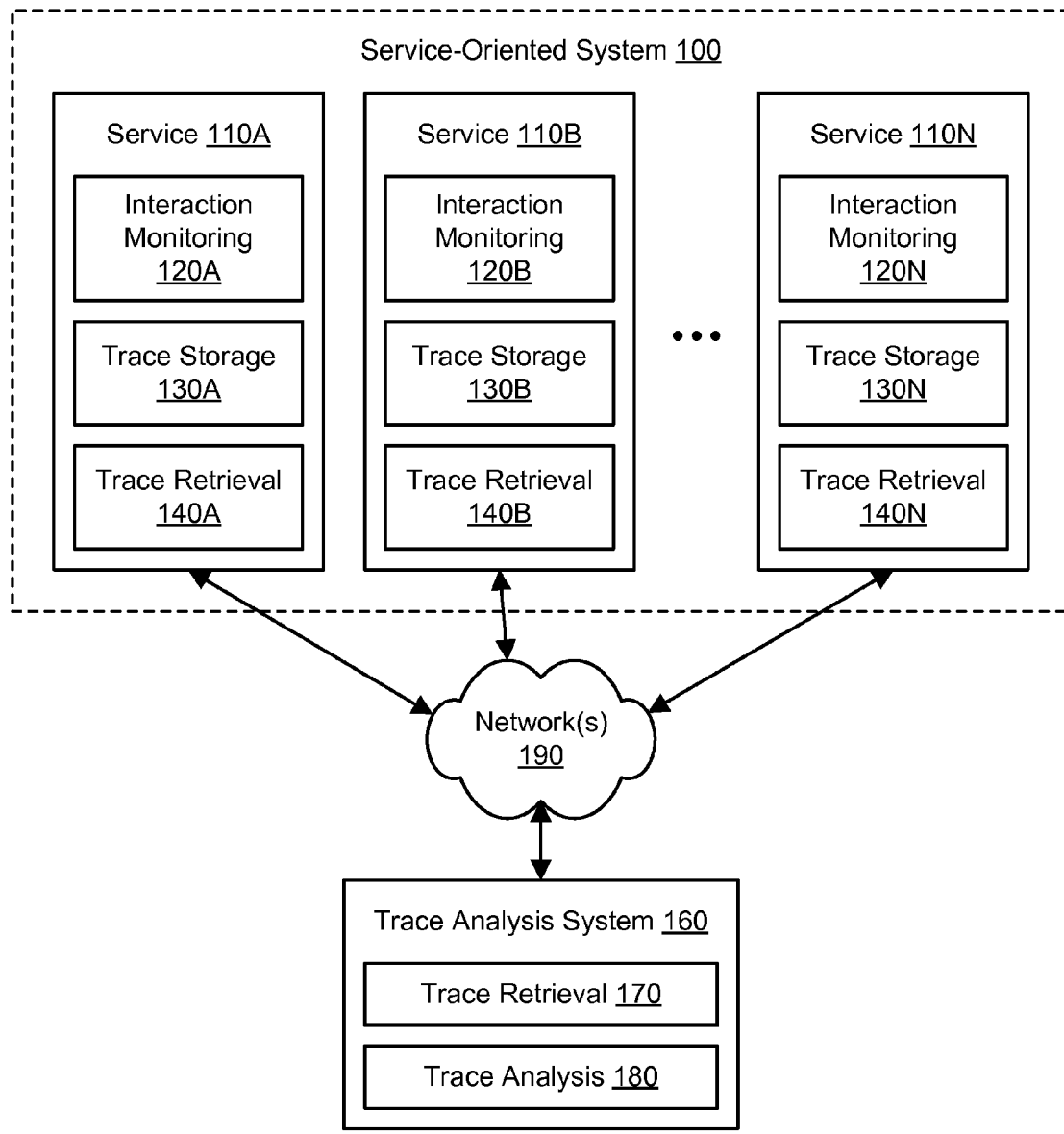
FIG. 1 illustrates an example system environment for distributed trace storage in a service-oriented system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for interaction reconstruction in a service-oriented system are described. Using the techniques described herein, interactions between services (e.g., service requests and service responses) in a distributed system may be monitored by individual services. For at least some of the interactions, traces (referred to herein as "full traces") may be generated in a full tracing mode. A full trace may include detailed information about the interactions, including call path data. A variety of routes may be generated and stored based on the call path data. For at least some of the interactions, traces (referred to herein as "sparse traces") may be generated in a sparse tracing mode. A sparse trace may include identifiers of the various nodes involved in the trace but may exclude more detailed information such as call path data. A particular sparse trace may be matched to one or more of the stored, predetermined routes. The sparse trace may be matched to the route(s) by comparing the node identifiers in the sparse trace to the node identifiers in the set of stored routes. The sparse tracing mode may be used for more interactions than the full tracing mode, and sparse traces may be matched to predetermined routes upon request. By using interaction reconstruction for sparse traces rather than generating and storing full traces for all interactions, resources in a service-oriented system with tracing may be used more efficiently.

Various embodiments of methods and systems for distributed trace storage in a service-oriented system are described. Using the techniques described herein, interactions between services (e.g., service requests and service responses) in a distributed system may be monitored by individual services. The individual services may monitor substantially all interactions, and trace data may be generated based on the interaction monitoring. Instead of sending all of the trace data to a centralized component, the individual services may store the resulting trace data using locally accessible storage, e.g., persistent storage managed by service hosts. Individual elements of trace data, such as trace events, may be stored until an expiration time is reached or until space is needed for newer elements of trace data. Related log data may also be stored by the individual services. Upon request, the individual services may retrieve stored elements of trace data and provide them to an external component such as a trace analysis system. By transmitting and analyzing only selected elements of trace data in this manner, network resources and/or computing resources may be used more efficiently.

Distributed Trace Storage

FIG. 1 illustrates an example system environment for distributed trace storage in a service-oriented system, according to some embodiments. The example system environment may include a service-oriented system 100 and a trace analysis system 160. The service-oriented system 100 may implement a service-oriented architecture and may include multiple services 110A-110N configured to communicate with each other (e.g., through message passing) to carry out various tasks, such as business functions. Although three services 110A, 110B, and 110N are illustrated for purposes of example, it is contemplated that any suitable number of services may be used with the service-oriented system 100. Any of the services 110A-110N may represent different services (e.g., different sets of program code) or different instances of the same service. The services 110A-110N may be implemented using a plurality of hosts, any of which may be implemented by the example computing device 3000 illustrated in FIG. 22. The hosts may be located in any suitable number of data centers or geographical locations. In one embodiment, multiple services and/or instances of the same service may be implemented using the same host. It is contemplated that the service-oriented system 100 and/or trace analysis system 160 may include additional components not shown, fewer components than shown, or different combinations, configurations, or quantities of the components shown.

Each service 110A-110N may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. In some embodiments, services may be loosely coupled in order to minimize (or in some cases eliminate) interdependencies among services. This modularity may enable services to be reused in order to build various applications through a process referred to as orchestration. A service may include one or more components that may also participate in the service-oriented system, e.g., by passing messages to other services or to other components within the same service.

The service-oriented system 100 may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes.

The services 110A-110N described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

In one embodiment, each of the services 110A-110N may be configured with one or more components for monitoring interactions between services. For example, service 110A may include an interaction monitoring functionality 120A, service 110B may include an interaction monitoring functionality 120B, and service 110N may include an interaction monitoring functionality 120N. The interaction monitoring functionality 120A, 120B, or 120N may monitor or track interactions between the corresponding service 110A, 110B, or 110N and other services (or components of services) in the service-oriented system 100. The monitored interactions may include service requests (i.e., requests for services to be performed), responses to requests, and other suitable events.

In one embodiment, the interaction monitoring functionality 120A, 120B, or 120N may monitor service interactions in any suitable environment, such as a production environment and/or a test environment. The production environment may be a "real-world" environment in which a set of production services are invoked, either directly or indirectly, by interactions with a real-world client, consumer, or customer, e.g., of an online merchant or provider of web-based services. In one embodiment, the test environment may be an environment in which a set of test services are invoked in order to test their functionality. The test environment may be isolated from real-world clients, consumers, or customers of an online merchant or provider of web-based services. In one embodiment, the test environment may be implemented by configuring suitable elements of computing hardware and software in a manner designed to mimic the functionality of the production environment. In one embodiment, the test environment may temporarily borrow resources from the production environment. In one embodiment, the test environment may be configured to shadow the production environment, such that individual test services represent shadow instances of corresponding production services. When the production environment is run in shadow mode, copies of requests generated by production services may be forwarded to shadow instances in the test environment to execute the same transactions.

To monitor the service interactions, lightweight instrumentation may be added to services, including services 110A-110N. The instrumentation (e.g., a reporting agent associated with each service) may collect and report data associated with each inbound request, outbound request, or other service interaction (e.g., a timer-based interaction) processed by a service. Further aspects of the interaction monitoring functionality 120A-120N are discussed below with respect to FIG. 16 through FIG. 21.

Based on the interaction monitoring, the services 110A-110N may generate and/or collect trace data. The trace data may describe aspects of the service interactions. In one embodiment, the trace data may be generated in real-time or near real-time, e.g., as service requests and service responses are received and/or processed by the services. The trace data may include call path data or other data indicative of relationships between individual services, such as an identification of the calling (i.e., requesting) service and the called (i.e., requested) service for each interaction. The trace data may include metadata such as request identifiers that are usable to identify paths of service requests and responses from service to service. Request identifiers, also referred to herein as trace identifiers, are discussed in greater detail below with respect to FIG. 16 through FIG. 21. The trace data may also include data describing the performance of the service interactions. For example, the trace data may include data indicative of network latency for a request or response, data indicative of network throughput for one or more interactions, data indicative of service reliability or availability, data indicative of resource usage, etc.

In one embodiment, the interaction monitoring functionality 120A-120N of the various services 110A-110N may be configured to monitor all or substantially all of the service interactions. In one embodiment, the trace data generated at particular services may be stored using storage resources that are local to the particular services. Accordingly, as shown in FIG. 1, service 110A may include a trace storage functionality 130A, service 110B may include a trace storage functionality 130B, and service 110N may include a trace storage functionality 130N. The trace storage functionality 130A, 130B, or 130N at a particular service 110A, 110B, or 110N may be used to store trace data generated by the interaction monitoring functionality 120A, 120B, 120N at the particular service. In one embodiment, the trace storage 130A-130N may include or use locally accessible storage resources, e.g., persistent storage resources managed by a host that implements one or more services. For example, the trace storage 130A-130N may include or use disk drives at the hosts that implement the services 110A-110N. In one embodiment, the trace storage 130A-130N may include or use network-attached storage or other network-accessible storage resources that are exclusively used by particular service hosts. The local storage of trace data may be configurable by host, by service, and/or on any other suitable basis.

The service-oriented system 100 may thus implement distributed storage of trace data. In one embodiment, selected elements of the stored trace data may be retrieved from the locally accessible storage upon request from a centralized component such as the trace analysis system 160. The trace analysis system 160 may be coupled to the services 110A-110N through one or more networks 190. When the trace analysis system 160 seeks to retrieve one or more stored traces from the services 110A-110N, a trace retrieval functionality 170 of the trace analysis system 160 may interact with a trace retrieval functionality at one or more of the services 110A-110N. As shown in FIG. 1, service 110A may include a trace retrieval functionality 140A, service 110B may include a trace retrieval functionality 140B, and service 110N may include a trace retrieval functionality 140N. Using any suitable interface(s), the trace retrieval functionality 170 of the trace analysis system 160 may specify any suitable identifying information to the trace retrieval functionality 140A-140N to obtain trace data stored using the trace storage 130A-130N. For example, the trace retrieval functionality 170 may specify a trace identifier to obtain trace events that have that trace identifier. Each trace retrieval functionality 140A-140N may retrieve the requested trace data stored using the corresponding trace storage 130A-130N and provided the retrieved trace data to the trace analysis system 160 using any suitable interface(s). By using the network(s) 190 to transmit only selected trace data and not all trace data from the services 110A-110N to the trace analysis system 160, network resources may be used more efficiently.

The trace analysis system 160 may seek to retrieve selected elements of trace data from the services 110A-110N either automatically or in response to user commands. For example, if an error is encountered in the service-oriented system 110, the trace analysis system 160 and/or a user may detect the error. In response to a user command or through automatic execution of a program, the trace analysis system 160 may then attempt to obtain trace data that is relevant to one or more particular transactions, one or more particular hosts, and/or one or more particular services.

Figure 22:
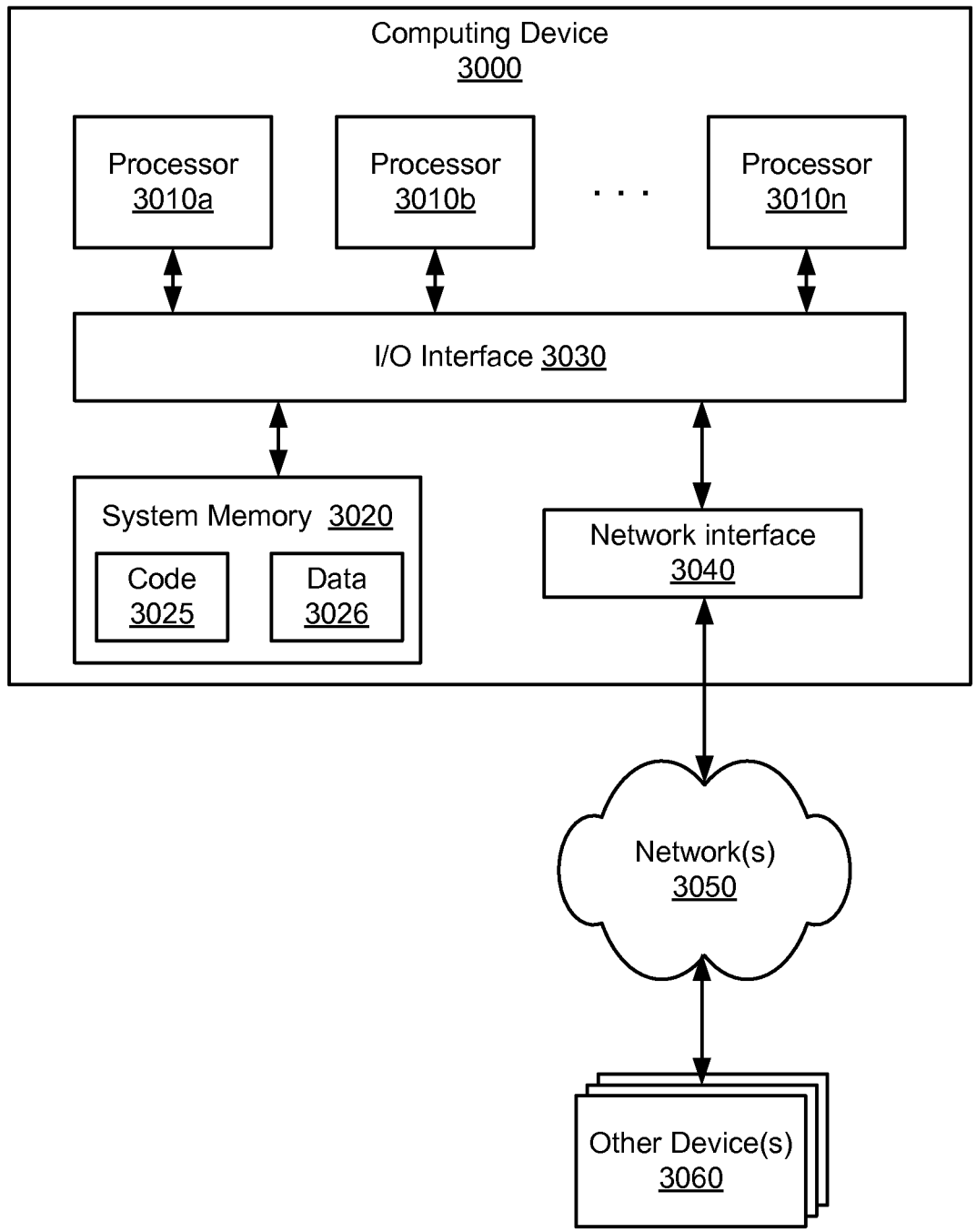
FIG. 22 illustrates an example of a computing device that may be used in some embodiments.

The trace analysis system 160 may include one or more computing devices, any of which may be implemented by the example computing device 3000 illustrated in FIG. 22. The trace analysis system 160 may also include a trace analysis functionality 180. The trace analysis functionality 180 may perform aggregation and/or analysis of trace data from one or more of the services 110A-110N. For example, the trace analysis functionality 180 may analyze trace data after an error has been encountered to debug one or more of the services 110A-110N. In various embodiments, the trace analysis functionality 180 may be used for performance analysis, data flow analysis, and/or optimization of the service-oriented system 100 based on trace data.

Using the trace analysis functionality 180, the trace analysis system 160 may analyze the performance data generated by the interaction monitoring functionality 120A-120N and received by the trace analysis system 160 in the trace data. The trace analysis functionality 180 may determine one or more performance metrics based on the trace data. In one embodiment, the performance metrics may describe aspects of the performance of multiple interactions, such as metrics representing aggregate performance, average performances, etc. In one embodiment, the performance metrics may describe aspects of the performance of individual interactions. For example, the trace analysis system 160 may calculate the client-measured latency for an interaction based on the time at which a request was sent by a service and also on the time at which a response to the request was received by the service. The trace analysis system 160 may also calculate the server-measured latency for an interaction based on the time at which a request was received by a service and also on the time at which a response to the request was sent by the service. The network transit time for the interaction may be calculated as the difference between the client-measured latency and the server-measured latency. Accordingly, the performance metrics may include individual transit times for individual service calls and/or transit time metrics (e.g., mean, median, etc.) for multiple service calls. Network transit times may be impacted by the number of network hops, the physical distance between hops, and the link quality between endpoints. In one embodiment, the performance metrics may describe aspects of the costs of performing or maintaining various interactions, services, instances of services, and/or hosts. For example, the cost may include elements of computing resource usage (e.g., processor usage, persistent storage usage, memory usage, etc.), energy consumption, heat production, and/or any other suitable cost element(s).

The interaction monitoring functionality 120A-120N for the various services may collect data indicative of service interactions involved in satisfying a particular initial request, e.g., data indicative of a route taken in satisfying a service request and/or a hierarchy of call pathways between services. The route may correspond to a set of call paths between services. The call paths may represent inbound service requests and outbound service requests relative to a particular service. To process a given received request, one or more services may be invoked. As used herein, an initial request may be referred to as the "root request." In various embodiments, the root request may but need not originate from a computer system outside of the service-oriented system 100. In many embodiments, a root request may be processed by an initial service, which may then call one or more other services. Additionally, each of those services may also call one or more other services, and so on until the root request is completely fulfilled. The particular services called to fulfill a request may be represented as a call graph that specifies, for each particular service of multiple services called to fulfill the same root request, the service that called the particular service and any services called by the particular service.

Using the trace analysis functionality 180, the trace analysis system 160 may analyze the trace data and generate one or more call graphs based on connectivity information within the trace data. Each call graph may represent the flow of requests from service to service and may identify service dependencies. Each call graph may include a plurality of nodes representing services and one or more edges (also referred to as call paths) representing service interactions. Each of the call graphs may include a hierarchical data structure that include nodes representing the services and edges representing the interactions. In some cases, a call graph may be a deep and broad tree with multiple branches each representing a series of related service calls. The trace analysis functionality 180 may use any suitable data and metadata to build each call graph, such as request identifiers and metadata associated with services and their interactions. The request identifiers and metadata are discussed below with respect to FIG. 16 through FIG. 21. In one embodiment, the trace analysis functionality 180 may analyze the trace data and generate suitable reports and/or visualizations (e.g., call graph visualizations) based on the trace data.

Using the trace analysis functionality 180, the trace analysis system 160 may determine an optimized configuration for at least a portion of the one or more call graph(s). As used herein, the term "optimized" generally means "improved" rather than "optimal." The optimized configuration for a set of services may represent an improvement on the existing configuration of the set of services with respect to one or more performance metrics (e.g., network latency or transit times, throughput, reliability or availability, cost, etc.) for at least a portion of the one or more call graphs. Accordingly, the optimized configuration may be determined based on the one or more performance metrics in order to optimize one or more call paths of the one or more call graphs. In one embodiment, the optimized configuration may also be determined based on additional information that is not derived from trace data, such as an expense associated with each service instance, service interaction, host, and/or unit of resource consumption. In one embodiment, the optimized configuration may be determined such that it minimizes, maximizes, decreases, or increases a total performance metric for one or more call paths. For example, the optimized configuration may minimize or reduce the network latency for one or more call paths, maximize or increase the throughput for one or more call paths, maximize or increase the reliability or availability for one or more call paths, or minimize or reduce the cost for one or more call paths. The optimizer may take into account the sensitivity of a particular call path to latency, e.g., whether improving the latency of one event would improve the latency of another event in a call graph. Any suitable component(s) may be used to implement the optimizer. For example, the optimizer may be implemented using a constrained optimization solver which is configured to minimize a cost function or an energy function in the presence of one or more constraints or to maximize a reward function or a utility function in the presence of one or more constraints. The optimizer may generate an optimized configuration by optimizing a user-defined function of network latency, throughput, reliability, cost, and/or any other suitable term(s).

In one embodiment, data and/or metadata associated with a request or response may be compressed, encrypted, or serialized by a service. Similarly, data and/or metadata associated with a request or response may be decompressed, decrypted, or deserialized upon receipt by a service. The cost or time associated with compression, decompression, encryption, decryption, serialization, and/or deserialization may be taken into account by the optimizer. Accordingly, performance metrics associated with the costs of preparing a message for network transport and processing such a received message (e.g., the costs of compression, decompression, encryption, decryption, serialization, and/or deserialization) may be collected as part of the trace data. Additionally, the optimizer may take into account such performance data as CPU (central processing unit) utilization for program code, memory utilization for program code, and any other suitable data. In one embodiment, the trace analysis system 160 may collect performance data from sources other than the interaction monitoring components.

Figure 2:
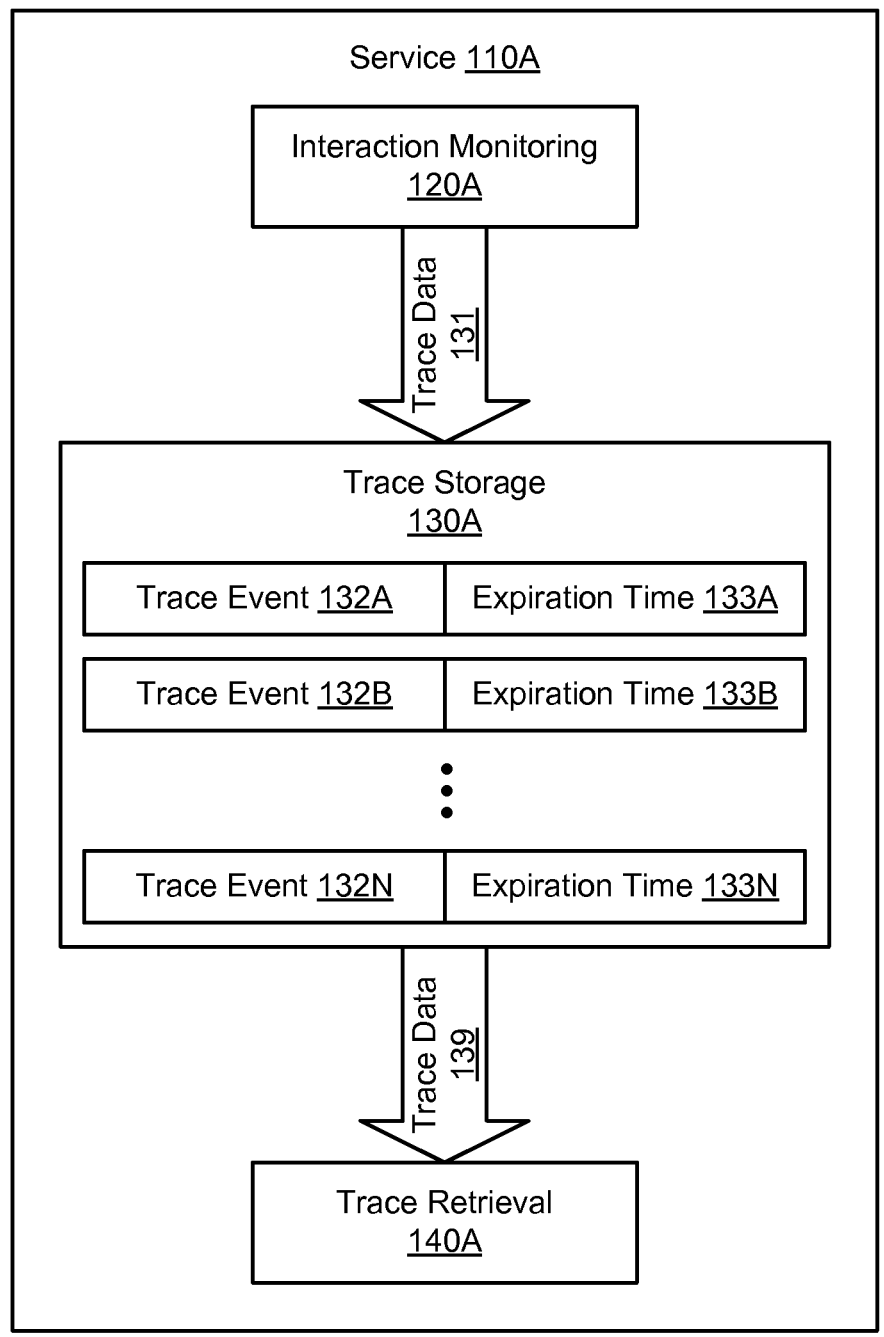
FIG. 2 illustrates expiration times for distributed trace storage in a service-oriented system, according to some embodiments.

FIG. 2 illustrates expiration times for distributed trace storage in a service-oriented system, according to some embodiments. Individual elements of trace data, such as trace events, may be stored until an expiration time is reached or until space is needed for newer elements of trace data. As shown in the example of FIG. 2, the interaction monitoring functionality 120A of service 110A may generate trace data 131 based on interactions with other services. The trace data 131 may be stored in locally accessible storage using the trace storage functionality 130A. The stored trace data may include a plurality of trace events. Although three trace events 132A, 132B, and 132N are shown for purposes of illustration and example, it is contemplated that any suitable number of trace events may be stored in the trace storage 130A. Each trace event may relate to a particular interaction (e.g., a service request or service response) with another service. Each trace event may include trace data and/or metadata, such as a trace identifier (e.g., a request identifier), call path data identifying the other service(s) in the service interaction, a timestamp, parameters of the request or response, and/or other suitable information. Individual elements of trace data 139 (e.g., one or more of the trace events 132A-132N) may be retrieved from storage by the trace retrieval functionality 140A, e.g., upon request from an external component.

In one embodiment, each trace event may be associated with an expiration time. For example, the trace event 132A may be associated with an expiration time 133A, the trace event 132B may be associated with an expiration time 133B, and the trace event 132N may be associated with an expiration time 133N. The expiration times 133A-133N may be automatically assigned on any suitable basis. In one embodiment, the expiration times 133A-133N may vary based on the times at which the corresponding trace events 132A-132N were generated or stored. In one embodiment, for example, the trace storage 130A may be configured to store each trace event 132A-132N for a fixed time after the event is generated or stored. When the expiration time for a trace event is reached, the trace storage functionality 130A may automatically delete the expired event, mark the expired event for deletion, or make the expired event or its storage location(s) available to be overwritten by newer trace events. Accordingly, the availability of a trace event may not be guaranteed after its expiration time has been reached. In one embodiment, the expiration times 133A-133N may represent times at which the corresponding trace events were stored or other indicators of storage priority, such that the oldest or lowest-priority trace events may be retained in the trace storage 130A only until space is needed to store newer or higher-priority trace events. In one embodiment, the expiration times 133A-133N may be the same, or a global expiration time may be applied to a set of trace events.

Figure 3:
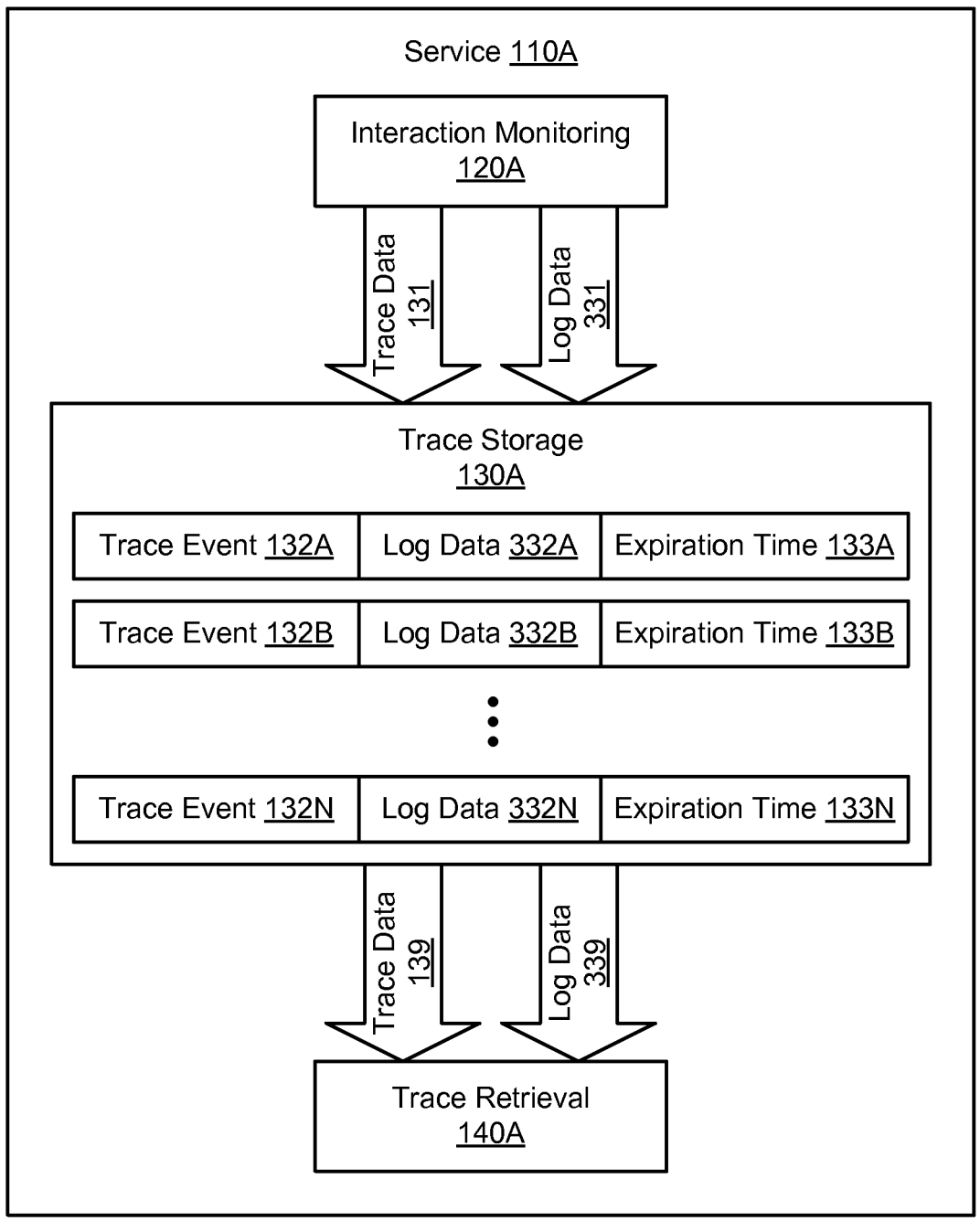
FIG. 3 illustrates log data storage with distributed trace storage in a service-oriented system, according to some embodiments.

FIG. 3 illustrates log data storage with distributed trace storage in a service-oriented system, according to some embodiments. As shown in the example of FIG. 3, the interaction monitoring functionality 120A of service 110A may generate log data 331 based on interactions with other services. The log data 331 may also be stored in locally accessible storage using the trace storage functionality 130A. Although three elements of log data 332A, 332B, and 332N are shown for purposes of illustration and example, it is contemplated that any suitable amount or configuration of log data may be stored in the trace storage 130A. Each element of log data may relate to a particular trace event and thus to a particular interaction (e.g., a service request or service response) with another service. For example, as shown in FIG. 3, log data 332A may relate to trace event 132A, log data 332B may relate to trace event 132B, and log data 332N may relate to trace event 132N. The elements of log data 332A-332N may include information regarding the processing or receipt of a service request or service response, including error messages, debug messages, internal checkpoints, processing results, timestamps, trace identifiers (e.g., request identifiers), request parameters or response parameters, and/or other suitable data and/or metadata. In various embodiments, an element of log data 332A-332N may be stored in the same repository or file as the corresponding trace events 132A-132N or in a separate log or repository from the trace events 132A-132N. When trace data 139 is retrieved, related elements of log data 339 may also be retrieved from storage by the trace retrieval functionality 140A. An element of log data may be identified for retrieval based on any suitable metadata that establishes a correspondence with a trace event, such as a common trace identifier, common timestamp, and/or common storage location. Typically, log data may be used for debugging purposes by the trace analysis system 160.

In one embodiment, elements of log data may be subject to the same expiration times as the corresponding trace events. Accordingly, an element of log data may be automatically deleted or marked for deletion at substantially the same time as the corresponding trace event. In one embodiment, however, elements of log data may be subject to different expiration times than the corresponding trace events.

Figure 4:
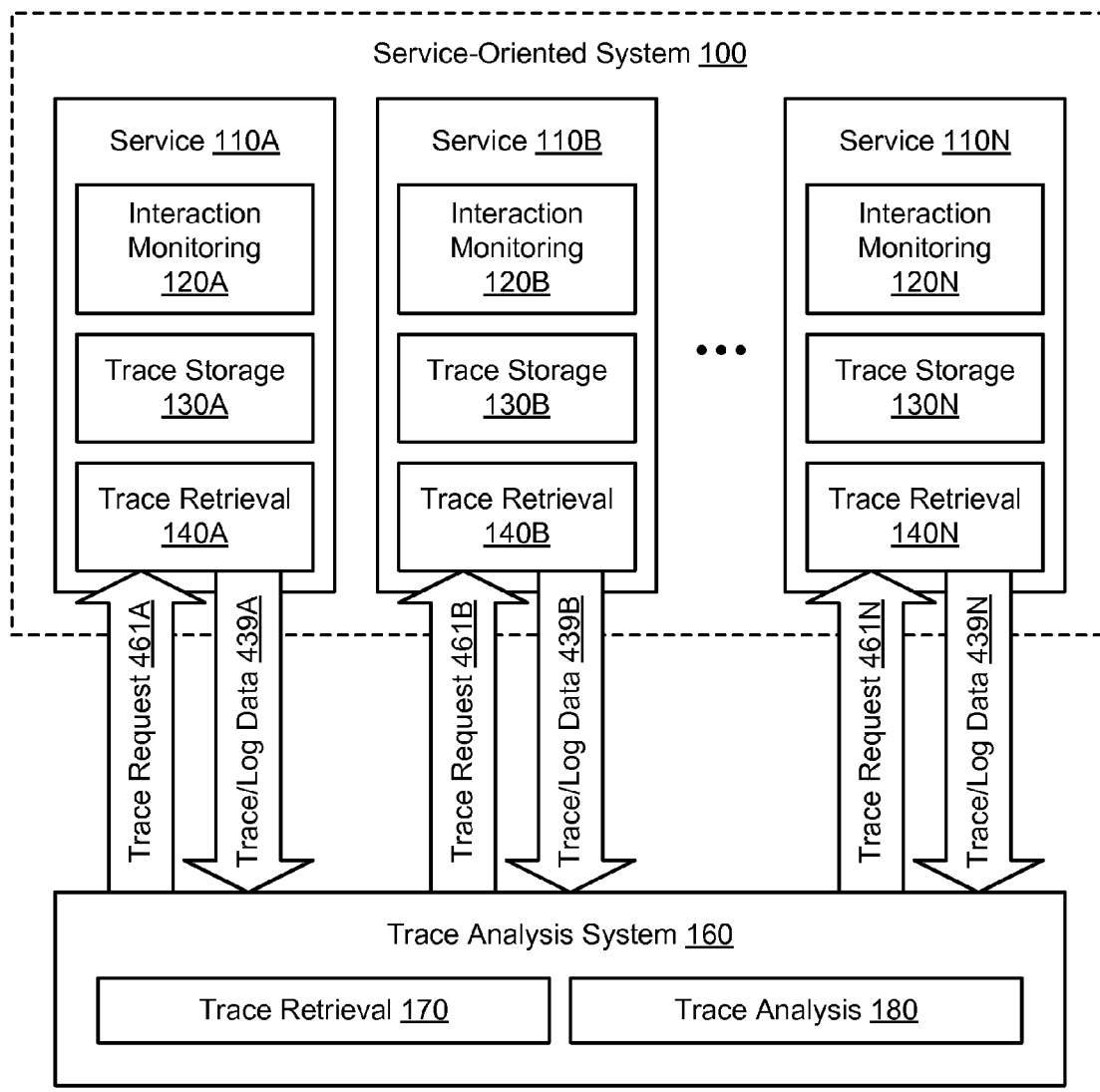
FIG. 4 illustrates retrieval of stored distributed trace data upon request in a service-oriented system, according to some embodiments.

FIG. 4 illustrates retrieval of stored distributed trace data upon request in a service-oriented system, according to some embodiments. Upon request, the individual services 110A-110N may retrieve stored elements of trace data (and optionally, related log data) and provide them to an external component such as the trace analysis system 160. As shown in the example of FIG. 4, the trace analysis system 160 may issue a trace request 461A to service 110A and receive trace data and related log data 439A responsive to the request. Similarly, the trace analysis system 160 may issue a trace request 461B to service 110B and receive trace data and related log data 439B responsive to the request. Additionally, the trace analysis system 160 may issue a trace request 461N to service 110N and receive trace data and related log data 439N responsive to the request. The trace requests 461A-461N may be sent to the services 110A-110N using any suitable interface(s). The trace requests 461A-461N may specify the desired trace data using any suitable data or metadata, such as trace identifiers (e.g., request identifiers), service names, host names, and/or timestamps. The trace retrieval 140A-140N may retrieve log data related to the requested trace data based on a correspondence between the log data and the requested trace data, e.g., a common trace identifier, common timestamp, and/or common storage location. As will be discussed in greater detail with respect to FIG. 9, the trace analysis system 160 may first retrieve trace data and log data from an initiating host and then follow call path data from downstream host to downstream host to retrieve additional trace data and additional log data related to the same trace.

Figure 5:
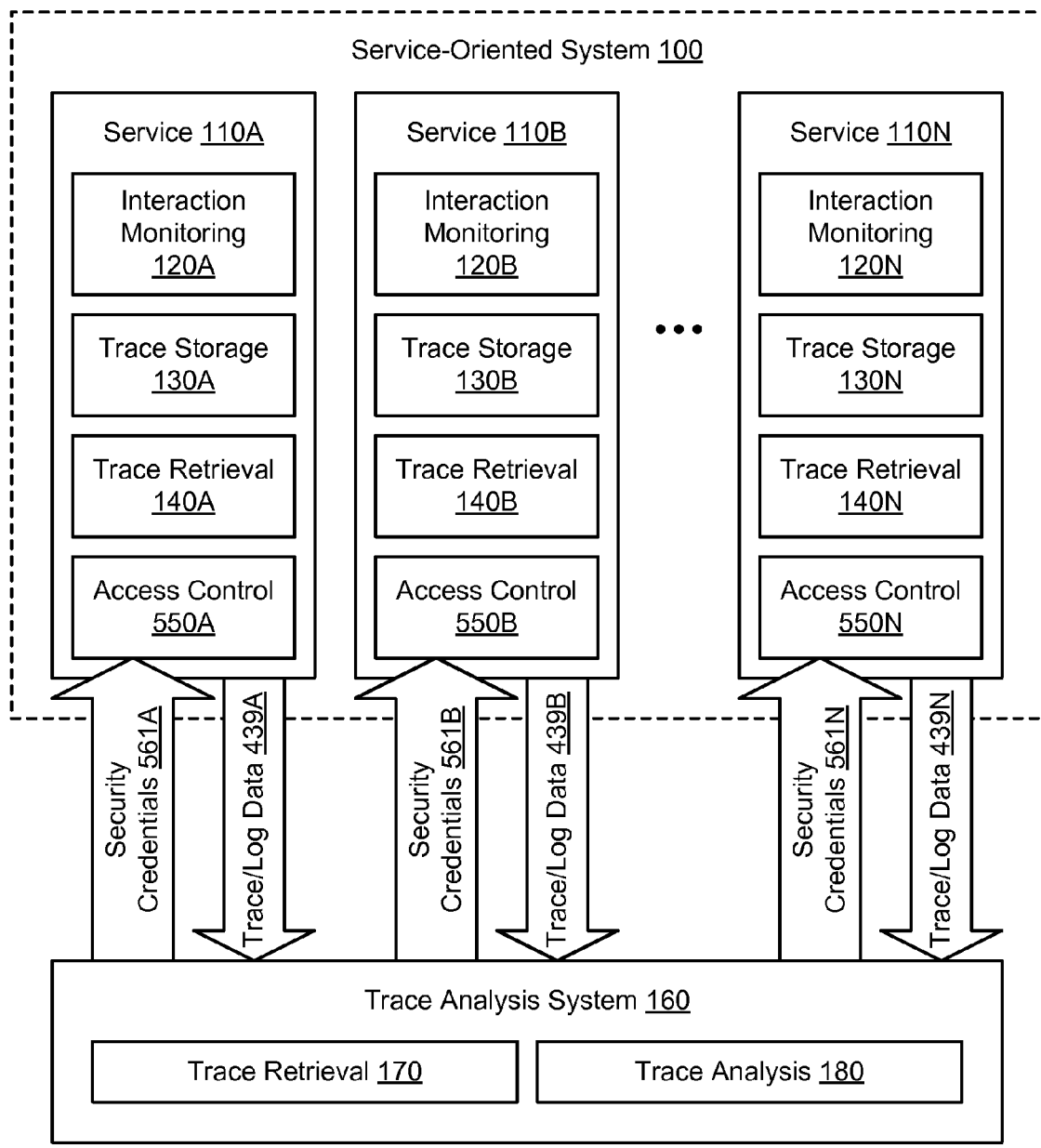
FIG. 5 illustrates retrieval of stored distributed trace data with access control in a service-oriented system, according to some embodiments.

FIG. 5 illustrates retrieval of stored distributed trace data with access control in a service-oriented system, according to some embodiments. When requesting trace data from a service, the trace analysis system 160 may supply any necessary security credentials to gain access to the service host and/or its storage resources. As shown in the example of FIG. 5, the trace analysis system 160 may supply security credentials 561A to service 110A to obtain trace data and related log data 439A, security credentials 561B to service 110B to obtain trace data and related log data 439B, and security credentials 561N to service 110N to obtain trace data and related log data 439N. The security credentials may include an identifier of the entity seeking access, a password, and/or any other suitable elements of data. The security credentials supplied to various services 110A-110N may vary. In one embodiment, a single set of security credentials may permit the trace analysis system 160 to obtain both trace data and related log data from a particular service. Accordingly, each of the services 110A, 110B, or 110N may include an access control functionality 550A, 550B, or 550N. The access control 550A-550N may verify that security credentials supplied by an external component (e.g., the trace analysis system 160) do permit the access to trace data (and optionally, related log data) sought by the external component. If sufficient security credentials are not supplied, the access control 550A-550N may deny access to the trace data (and optionally, related log data) at a particular host.

Figure 6:
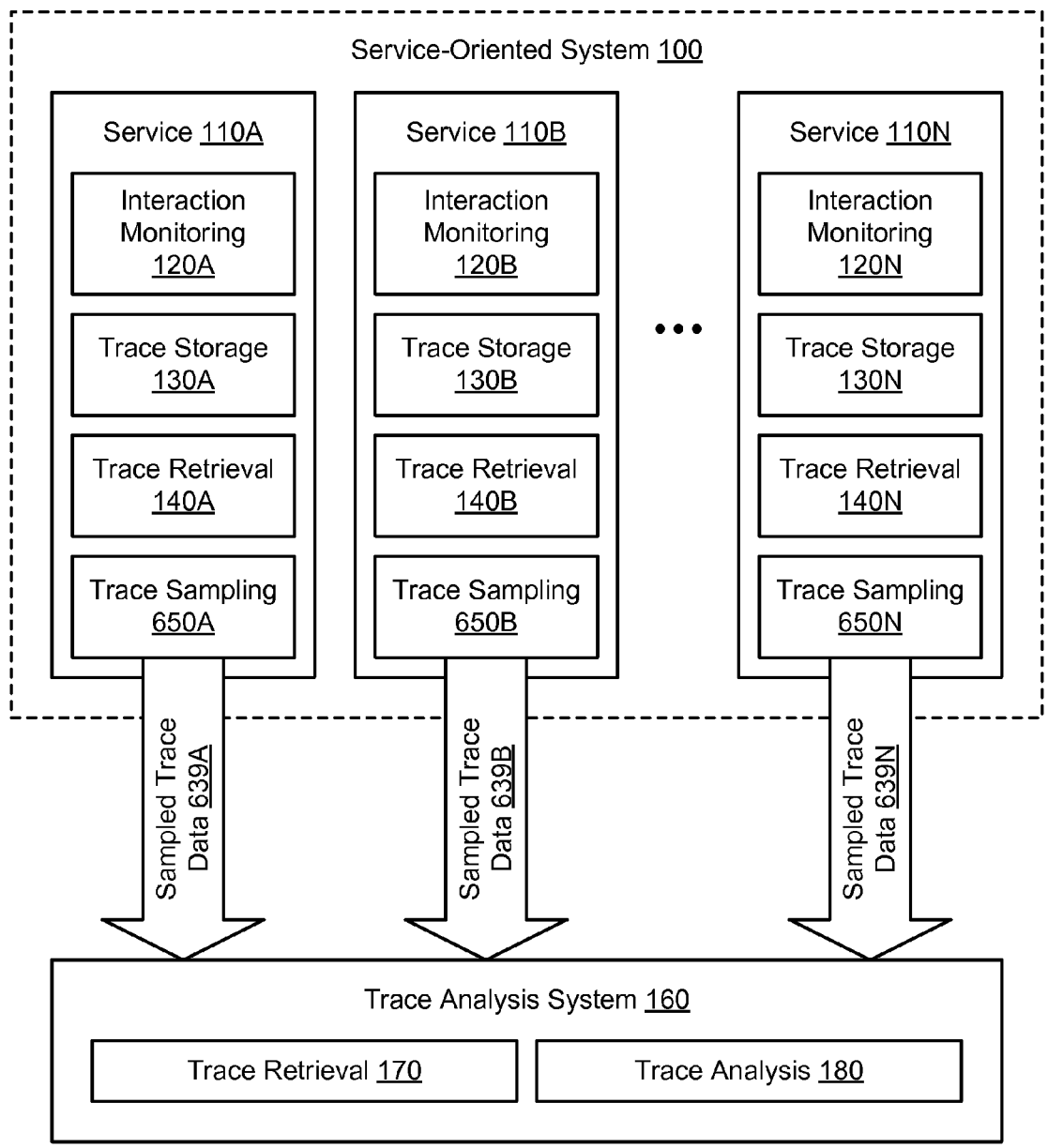
FIG. 6 illustrates sampling of real-time trace data in a service-oriented system, according to some embodiments.

FIG. 6 illustrates sampling of real-time trace data in a service-oriented system, according to some embodiments. In one embodiment, all or nearly all of the service interactions may be monitored to generate trace data, and that trace data may be stored locally by the hosts that implement the various services. In one embodiment, a sampled subset of the trace data may be provided to the trace analysis system 160 without the trace analysis system requesting the trace data. Any suitable technique may be used to identify which of the service interactions are provided to the trace analysis system 160. For example, probabilistic sampling techniques may be used to obtain the results of interaction monitoring for a certain percentage (e.g., 1%) of all service interactions. Accordingly, each of the services 110A, 110B, or 110N may include a trace sampling functionality 650A, 650B, or 650N configured to sample a subset of service interactions and supply the sampled subset to the trace analysis system 160. As shown in the example of FIG. 6, service 110A may generate and send sampled trace data 639A to the trace analysis system 160, service 110B may generate and send sampled trace data 639B, and service 110N may generate and send sampled trace data 639N. The sampled trace data 639A-639N may be sent at various times, e.g., after the sampled trace data is generated at various points during the operation of the services 110A-110N. In one embodiment, trace data may also be sent to the trace analysis system 160 automatically if particular types of errors are encountered during service interactions. The sampled trace data 639A-639N may also include related log data.

In one embodiment, the trace data 439A-439N or sampled trace data 639A-639N may include summarizations of trace data or other modifications to the original trace data. The trace analysis system 160 may request that the services 110A-110N perform one or more computations to summarize or modify the trace data. The summarized trace data may then be used (e.g., by the trace analysis functionality 180) to generate a summary of data from multiple service interactions, multiple services (e.g., services 110A-110N), and/or multiple hosts. For example, the trace analysis system 160 may request that each of the services 110A-110N maintain a summary of errors encountered in service interactions. The services 110A-110N may provide individual error summaries to the trace analysis system 160, which may then build an aggregate error summary across multiple services and/or multiple hosts. Similarly, the trace analysis system 160 may request that each of the services 110A-110N maintain a summary of performance metrics (e.g., average throughput) encountered in service interactions. The services 110A-110N may provide individual performance summaries to the trace analysis system 160, which may then build an aggregate performance summary across multiple services and/or multiple hosts.

Figure 7:
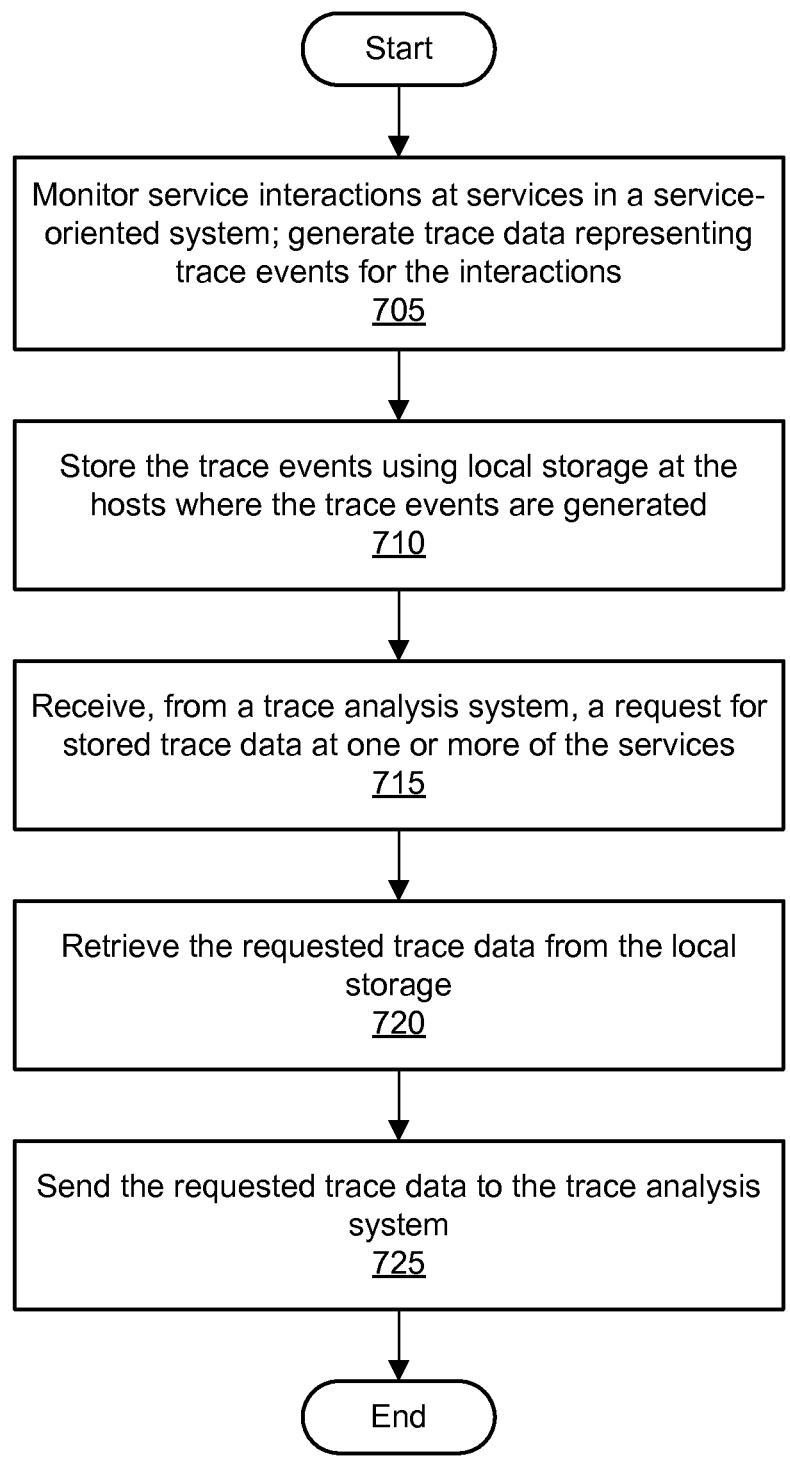
FIG. 7 is a flowchart illustrating a method for distributed trace storage in a service-oriented system, according to some embodiments.

FIG. 7 is a flowchart illustrating a method for distributed trace storage in a service-oriented system, according to some embodiments. As shown in 705, service interactions between services may be monitored, and trace data describing aspects of the interactions may be generated by the monitoring. The monitoring may be performed using instrumentation of individual services. In one embodiment, the trace data may be generated in real-time or near real-time, e.g., as service requests and service responses are received and/or processed by the services. The trace data may include trace events corresponding to individual service interactions.

As shown in 710, the trace events may be stored by the individual services using local storage at the hosts where the trace events were generated. In one embodiment, the trace events may be stored using persistent storage managed by service hosts. For example, the trace events may be stored on local hard drives or network-attached storage resources. Individual elements of trace data, such as trace events, may be stored until an expiration time is reached or until space is needed for newer elements of trace data.

As shown in 715, a request may be received at one or more of the services for stored trace data. The request may be received from a trace analysis system. In one embodiment, the one or more services may verify the security credentials of the requesting entity upon receipt of the request. As shown in 720, the one or more services may retrieve the requested trace data from the local storage (provided that the security credentials were verified). As shown in 725, the one or more services may send the requested trace data to the trace analysis system (again, provided that the security credentials were verified).

Figure 8:
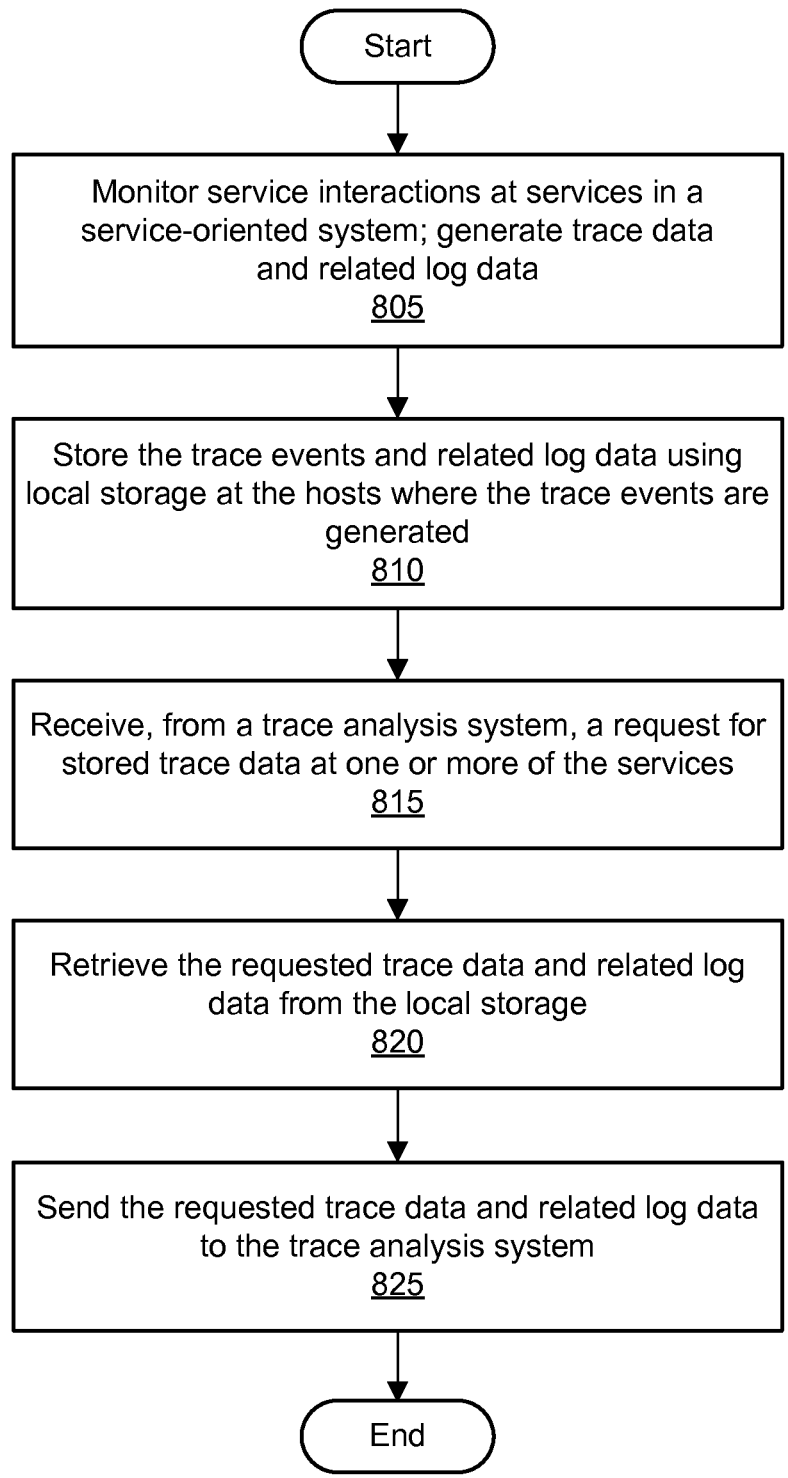
FIG. 8 is a flowchart illustrating a method for distributed trace storage and log storage in a service-oriented system, according to some embodiments.

FIG. 8 is a flowchart illustrating a method for distributed trace storage and log storage in a service-oriented system, according to some embodiments. As shown in 805, service interactions between services may be monitored, and trace data and related log data describing aspects of the interactions may be generated by the monitoring. The monitoring may be performed using instrumentation of individual services. In one embodiment, the trace data and log data may be generated in real-time or near real-time, e.g., as service requests and service responses are received and/or processed by the services. The trace data may include trace events corresponding to individual service interactions. The log data may include information regarding the processing or receipt of a service request or service response, including error messages, debug messages, internal checkpoints, processing results, timestamps, trace identifiers (e.g., request identifiers), request parameters or response parameters, and/or other suitable data and/or metadata.

As shown in 810, the trace events and related log data may be stored by the individual services using local storage at the hosts where the trace events and log data were generated. In one embodiment, the trace events and log data may be stored using persistent storage managed by service hosts. For example, the trace events and log data may be stored on local hard drives or network-attached storage resources. Individual elements of trace data, such as trace events, may be stored until an expiration time is reached or until space is needed for newer elements of trace data. The expiration times may also be applied to the related log data.

As shown in 815, a request may be received at one or more of the services for stored trace data. The request may be received from a trace analysis system. In one embodiment, the one or more services may verify the security credentials of the requesting entity upon receipt of the request. As shown in 820, the one or more services may retrieve the requested trace data and related log data from the local storage (provided that the security credentials were verified). An element of log data may be identified for retrieval based on any suitable metadata that establishes a correspondence with a trace event, such as a common trace identifier or common timestamp. As shown in 825, the one or more services may send the requested trace data and related log data to the trace analysis system (again, provided that the security credentials were verified).

Figure 9:
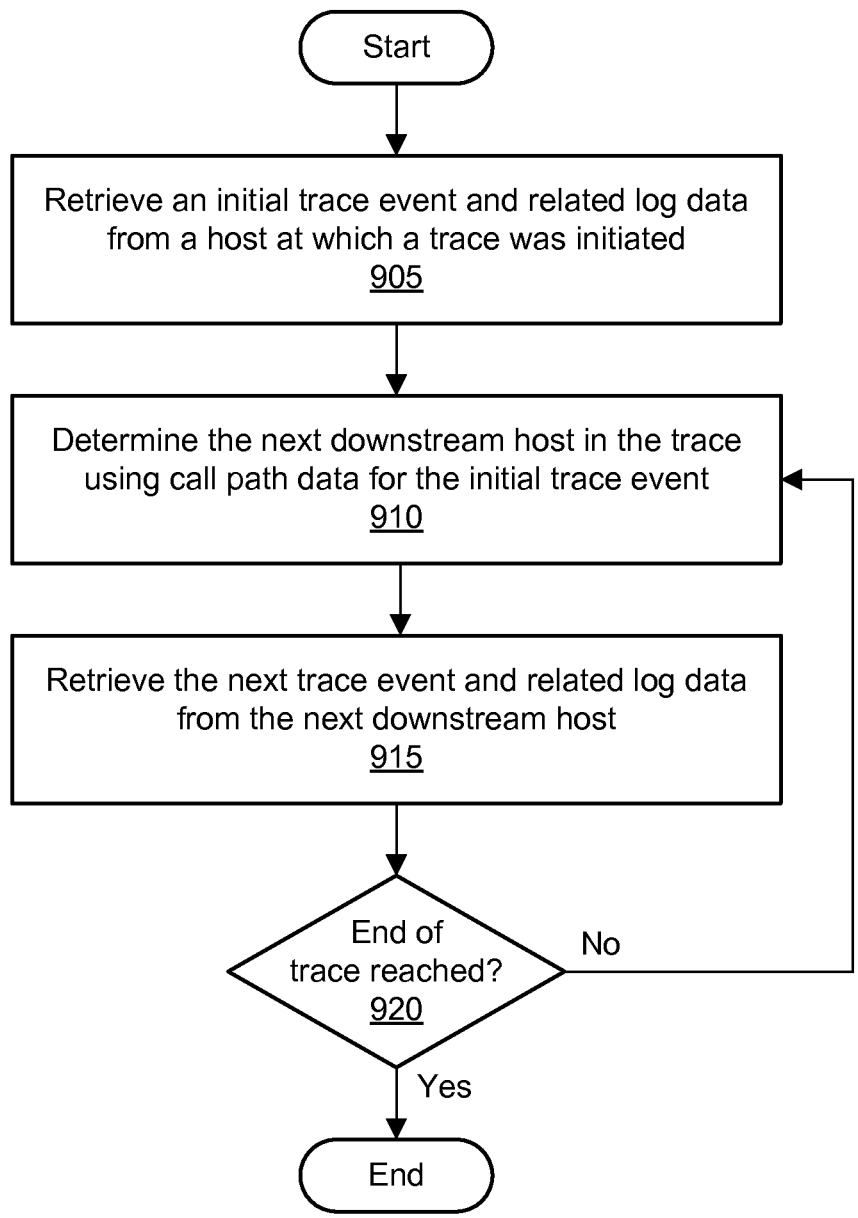
FIG. 9 is a flowchart illustrating a method for retrieval of stored distributed trace data in a service-oriented system, according to some embodiments.

FIG. 9 is a flowchart illustrating a method for retrieval of stored distributed trace data in a service-oriented system, according to some embodiments. As shown in 905, an initial trace event and related log data may be retrieved from a host at which a particular trace was initiated. The initial trace event and related log data may be retrieved upon request from an external component such as a trace analysis system. The initial trace event may include a trace identifier (e.g., a request identifier) as well as call path data. As shown in 910, the next downstream host in the trace may be identified using the call path data in the initial trace event. As shown in 915, the next trace event and related log data may be retrieved from the next downstream host, e.g., by specifying the trace identifier to the next downstream host. The next trace event may also include the trace identifier as well as call path data. As shown in 920, it may be determined whether the end of the trace has been reached. For example, the end of the trace has been reached if the most recently obtained trace event does not indicate a further downstream host. If the end of the trace has not been reached, then the operations shown in 910, 915, and 920 may be performed one or more additional times.

The operations shown in FIG. 7 through FIG. 9 may be performed for services at service hosts in a service-oriented system. The same or similar operations as those shown in FIG. 7 through FIG. 9 may be performed for nodes that interact with one another, e.g., in a distributed system. In this manner, traces generated for such nodes may be stored using local storage at various ones of the nodes.

Approximate Interaction Reconstruction

Figure 10:
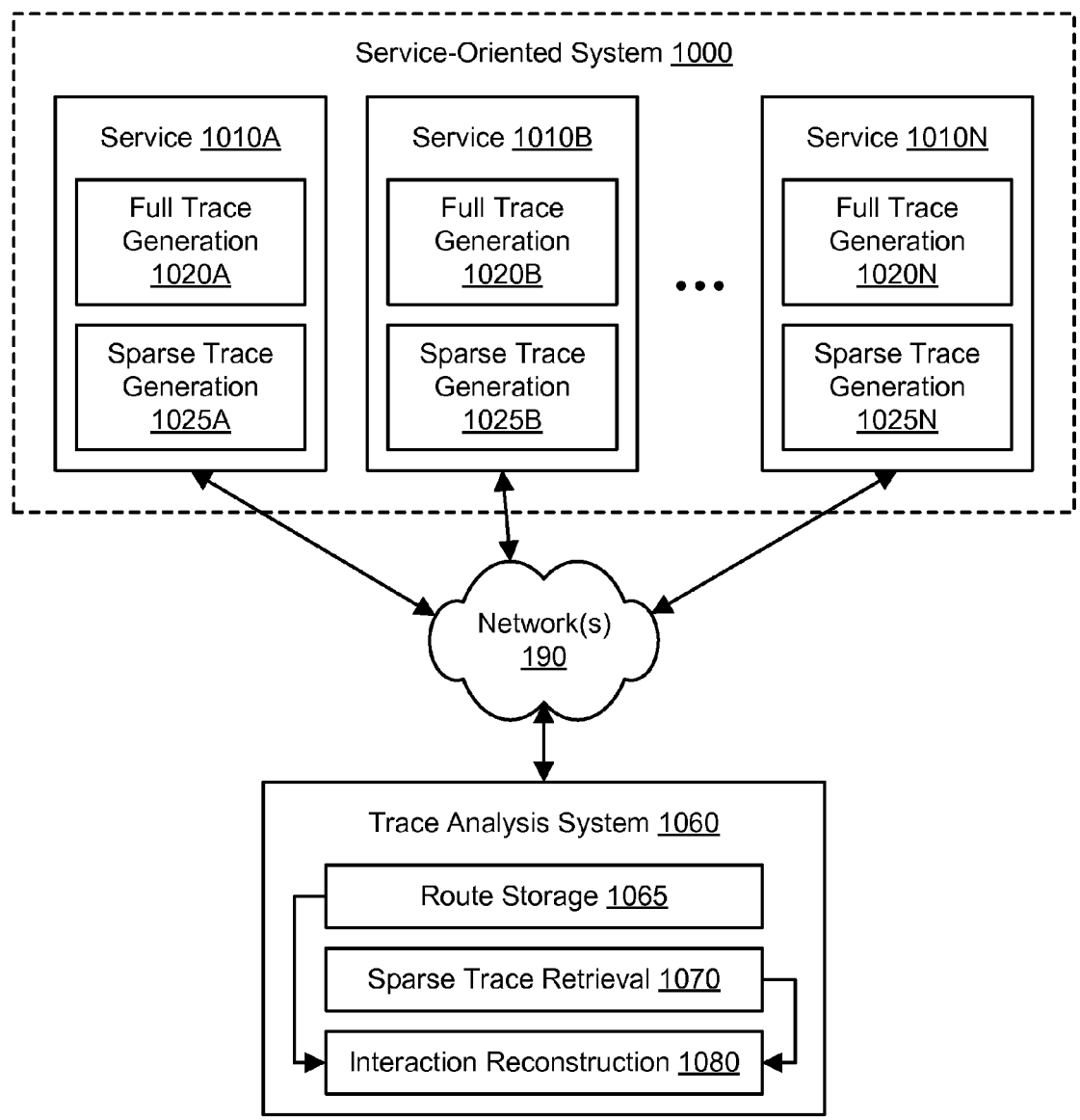
FIG. 10 illustrates an example system environment for interaction reconstruction in a service-oriented system, according to some embodiments.

FIG. 10 illustrates an example system environment for interaction reconstruction in a service-oriented system, according to some embodiments. The example system environment may include a service-oriented system 1000 and a trace analysis system 1060. The service-oriented system 1000 may implement a service-oriented architecture and may include multiple services 1010A-1010N configured to communicate with each other (e.g., through message passing) to carry out various tasks, such as business functions. Although three services 1010A, 1010B, and 1010N are illustrated for purposes of example, it is contemplated that any suitable number of services may be used with the service-oriented system 1000. Any of the services 1010A-1010N may represent different services (e.g., different sets of program code) or different instances of the same service. The services 1010A-1010N may be implemented using a plurality of hosts, any of which may be implemented by the example computing device 3000 illustrated in FIG. 22. The hosts may be located in any suitable number of data centers or geographical locations. In one embodiment, multiple services and/or instances of the same service may be implemented using the same host. It is contemplated that the service-oriented system 1000 and/or trace analysis system 1060 may include additional components not shown, fewer components than shown, or different combinations, configurations, or quantities of the components shown.

Each service 1010A-1010N may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. In some embodiments, services may be loosely coupled in order to minimize (or in some cases eliminate) interdependencies among services. This modularity may enable services to be reused in order to build various applications through a process referred to as orchestration. A service may include one or more components that may also participate in the service-oriented system, e.g., by passing messages to other services or to other components within the same service.

The service-oriented system 1000 may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes.

The services 1010A-1010N described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

In one embodiment, each of the services 1010A-1010N may be configured with one or more components for monitoring interactions between services. For example, service 1010A may include a full trace generation functionality 1020A, service 1010B may include a full trace generation functionality 1020B, and service 1010N may include a full trace generation functionality 1020N. Service 1010A may include a sparse trace generation functionality 1025A, service 1010B may include a sparse trace generation functionality 1025B, and service 1010N may include a sparse trace generation functionality 1025N. In one embodiment, aspects of the full trace generation 1020A-1020N and/or sparse trace generation 1025A-1025N may be implemented using the interaction monitoring functionality 120A-120N, e.g., as shown in FIG. 1. Both the full trace generation functionality 1020A-1020N and the sparse trace generation functionality 1025A-1025N may monitor or track interactions between the corresponding service 1010A-1010N and other services (or components of services) in the service-oriented system 1000. As will be discussed below, the information generated and propagated during the interaction monitoring may differ between the full trace generation and the sparse trace generation. The monitored interactions may include service requests (i.e., requests for services to be performed), responses to requests, and other suitable events.

In one embodiment, the full trace generation 1020A-1020N and sparse trace generation 1025A-1025N may monitor service interactions in any suitable environment, such as a production environment and/or a test environment. The production environment may be a "real-world" environment in which a set of production services are invoked, either directly or indirectly, by interactions with a real-world client, consumer, or customer, e.g., of an online merchant or provider of web-based services. In one embodiment, the test environment may be an environment in which a set of test services are invoked in order to test their functionality. The test environment may be isolated from real-world clients, consumers, or customers of an online merchant or provider of web-based services. In one embodiment, the test environment may be implemented by configuring suitable elements of computing hardware and software in a manner designed to mimic the functionality of the production environment. In one embodiment, the test environment may temporarily borrow resources from the production environment. In one embodiment, the test environment may be configured to shadow the production environment, such that individual test services represent shadow instances of corresponding production services. When the production environment is run in shadow mode, copies of requests generated by production services may be forwarded to shadow instances in the test environment to execute the same transactions.

To monitor the service interactions, lightweight instrumentation may be added to services, including services 1010A-1010N. The instrumentation (e.g., a reporting agent associated with each service) may collect and report data associated with each inbound request, outbound request, or other service interaction (e.g., a timer-based interaction) processed by a service. Further aspects of the interaction monitoring are discussed below with respect to FIG. 16 through FIG. 21.

Based on the interaction monitoring, the services 1010A-1010N may generate and/or collect trace data. The trace data may describe aspects of the service interactions. In one embodiment, the trace data may be generated in real-time or near real-time, e.g., as service requests and service responses are received and/or processed by the services. The full trace generation 1020A-1020N may generate "full" traces and propagate them to downstream nodes, while the sparse trace generation 1025A-1025N may generate "sparse" traces and propagate them to downstream nodes. The full trace data generated at a particular node may include call path data or other data indicative of relationships between individual services, such as an identification of the calling (i.e., requesting) service and the called (i.e., requested) service for each interaction. The full trace data may include metadata such as request identifiers. Request identifiers, also referred to herein as trace identifiers, are discussed in greater detail below with respect to FIG. 16 through FIG. 21. In one embodiment, the full trace data may include identifiers of nodes, e.g., service hosts. The node identifiers may represent identifiers of particular compute instances, service names, service instances, and/or any other data usable to identify a particular node in a route, including IP addresses of nodes. The node identifiers and call path data in a full trace may be used to generate a route, where the route represents a directed graph based on the nodes and call paths. The full trace data may also include data describing the performance of the service interactions. For example, the full trace data may include data indicative of network latency for a request or response, data indicative of network throughput for one or more interactions, data indicative of service reliability or availability, data indicative of resource usage, etc.

The full trace generation functionality 1020A-1020N for the various services may collect data indicative of service interactions involved in satisfying a particular initial request, e.g., data indicative of a route taken in satisfying a service request and/or a hierarchy of call pathways between services. The route may correspond to a set of call paths between services. The call paths may represent inbound service requests and outbound service requests relative to a particular service. To process a given received request, one or more services may be invoked. As used herein, an initial request may be referred to as the "root request." In various embodiments, the root request may but need not originate from a computer system outside of the service-oriented system 1000. In many embodiments, a root request may be processed by an initial service, which may then call one or more other services. Additionally, each of those services may also call one or more other services, and so on until the root request is completely fulfilled. The particular services called to fulfill a request may be represented as a call graph that specifies, for each particular service of multiple services called to fulfill the same root request, the service that called the particular service and any services called by the particular service.

The sparse trace data may include less information than the full trace data. The sparse trace data may include minimal metadata such as a trace identifier for each sparse trace. Trace identifiers are discussed in greater detail below with respect to FIG. 16 through FIG. 21. In one embodiment, a trace identifier may be generated for a sparse trace at the root node and propagated to downstream nodes in the trace. In one embodiment, the sparse trace data may also include identifiers of nodes, e.g., names of service hosts. The node identifiers may represent identifiers of particular compute instances, service names, service instances, and/or any other data usable to identify a particular node in a route, including IP addresses of nodes. In one embodiment, sparse trace data may exclude call path data for at least some of the nodes, such that a sparse trace may specify a set of node identifiers but not all of the relationships between the individual nodes. As used herein, call path data generally includes connectivity data, e.g., data regarding the relationships of nodes to other nodes in a set of interactions. In one embodiment, sparse trace data may include incomplete call path data or other connectivity data for a set of nodes. In one embodiment, sparse trace data may include transaction depth information for particular interactions but not identifiers of calling services and/or called services. Transaction depth is discussed in greater detail with respect to FIG. 16. In one embodiment, a timestamp may be collected only at the root node of a sparse trace. In one embodiment, a sparse trace may also include an indication that one or more errors occurred in the trace.

In one embodiment, full trace data may be generated for substantially all interactions and stored using local storage at service hosts, as described above with respect to FIG. 1 through FIG. 9. In one embodiment, full trace data may be generated for only a small portion of interactions, e.g., using a sampling approach to generate full traces for a percentage of interactions or to generate a particular number of full traces per time period. In one embodiment, full trace data may be generated for interactions that are of particular interest, e.g., when errors are detected. In one embodiment, sparse trace data may be generated for substantially all interactions or for substantially all interactions for which full trace data is not generated. As will be discussed below with reference to FIG. 11 and FIG. 12, either the full trace generation or the sparse trace generation may be used for a particular interaction at a particular node. In one embodiment, full tracing and/or sparse tracing may be disabled entirely for one or more nodes or for particular interactions.

In various circumstances, the full trace data and/or sparse trace data may be provided to a centralized component such as the trace analysis system 1060. The trace analysis system 1060 may be coupled to the services 1010A-1010N through one or more networks 190. In one embodiment, the full trace data may be stored using local storage at service hosts and provided to the trace analysis system 1060 upon request, as described above with respect to FIG. 1 through FIG. 9. In one embodiment, the full trace data may be pushed from individual nodes to the trace analysis system 1060 at appropriate intervals, particularly if the full trace data is generated for only a sample of interactions.

Using the techniques described herein, the trace analysis system 1060 may generate a plurality of routes based on the full trace data received from services 1010A-1010N. The node identifiers and call path data in a full trace may be used to generate a route, where the route represents a directed graph based on the nodes and call paths. The trace analysis system 1060 may analyze the full trace data and generate one or more call graphs based on connectivity information within the full trace data. Each call graph may represent the flow of requests from service to service and may identify service dependencies. Each call graph may include a plurality of nodes representing service instances and one or more edges (also referred to as call paths) representing service interactions. Each of the call graphs may include a hierarchical data structure that include nodes representing the services and edges representing the interactions. In some cases, a call graph may be a deep and broad tree with multiple branches each representing a series of related service calls. The trace analysis system 1060 may use any suitable data and metadata to build each call graph, such as request identifiers and metadata associated with services and their interactions. The request identifiers and metadata are discussed below with respect to FIG. 16 through FIG. 21. A plurality of routes representing call paths or call graphs for past interactions may be stored using a route storage functionality 1065. The route storage functionality 1065 may be implemented using any suitable storage techniques, including deduplication techniques.

In one embodiment, the sparse trace data may be pushed from individual nodes to the trace analysis system 1060 at appropriate intervals. In one embodiment, the sparse trace data may be stored using local storage at service hosts. In one embodiment, the sparse trace data may be stored using local storage at service hosts, and only a portion of the sparse trace data may be pushed to the trace analysis system 1060. The trace analysis system 1060 may include a sparse trace retrieval functionality 1070 that retrieves sparse trace data pushed by individual nodes or requested by the trace analysis system 1060. For example, if the trace analysis system 1060 seeks to perform analysis (e.g., interaction reconstruction) for a particular trace identifier (e.g., found in a log entry), the trace analysis system 1060 may use the sparse trace retrieval functionality 1070 to request and retrieve sparse trace data with the particular trace identifier from one or more other nodes. In one embodiment, the sparse trace retrieval functionality 1070 may broadcast or otherwise send a request for sparse trace data for one or more request identifiers to a large set of nodes.

The trace analysis system 1060 may include an interaction reconstruction functionality 1080. As discussed above, a sparse trace may include identifiers of the various nodes involved in the trace but may exclude more detailed information such as complete call path data. Using the interaction reconstruction functionality 1080, a particular sparse trace may be matched to one or more of the stored, predetermined routes. The sparse trace may be matched to the route(s) by comparing the node identifiers in the sparse trace to the node identifiers in the set of stored routes. The sparse tracing mode may be used for more interactions than the full tracing mode. In one embodiment, sparse traces may be matched to predetermined routes upon request, e.g., when more information about a particular sparse trace is desired by a user. In one embodiment, sparse traces may be matched to predetermined routes without specific requests, e.g., as part of a scheme to proactively provide more information for one or more sparse traces. By using interaction reconstruction in this manner, resources in a service-oriented system with tracing may be used more efficiently.

In one embodiment, one or more sparse traces may be analyzed, and the operation of the trace analysis system 1060 and/or service-oriented system 1000 may be modified based on the analysis. In other words, a feedback look may be established to modify tracing policy. For example, a sampling rate for one or more of the services 1010A-1010N may be modified based on analysis of one or more sparse traces and/or of the predetermined route(s) that are matched to the sparse trace(s).

The trace analysis system 1060 may include one or more computing devices, any of which may be implemented by the example computing device 3000 illustrated in FIG. 22. The trace analysis system 1060 may also include a trace analysis functionality. The trace analysis system 1060 may perform aggregation and/or analysis of trace data from one or more of the services 1010A-1010N. For example, the trace analysis system 1060 may analyze trace data after an error has been encountered to debug one or more of the services 1010A-1010N. In various embodiments, the trace analysis system 1060 may be used for performance analysis, data flow analysis, and/or optimization of the service-oriented system 1000 based on trace data.

Figure 11:
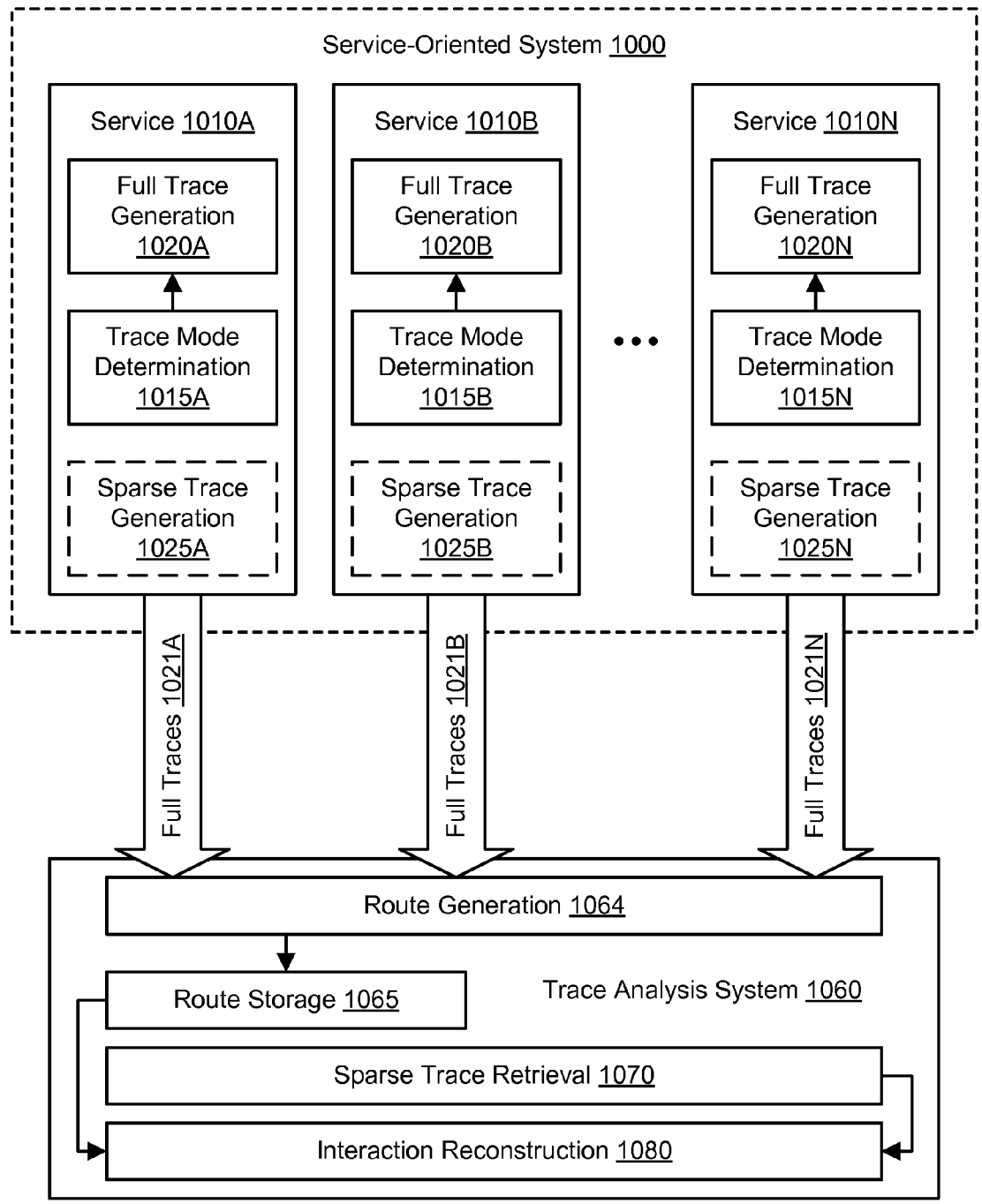
FIG. 11 illustrates further aspects of the example system environment for interaction reconstruction in a service-oriented system, including trace mode determination for full trace generation, according to some embodiments.

FIG. 11 illustrates further aspects of the example system environment for interaction reconstruction in a service-oriented system, including trace mode determination for full trace generation, according to some embodiments. As discussed above, the full trace generation 1020A-1020N may generate full traces and propagate them to downstream nodes, while the sparse trace generation 1025A-1025N may generate sparse traces and propagate them to downstream nodes. In one embodiment, individual nodes may include a trace mode determination functionality such as trace mode determination 1015A, 1015B, and 1015N. The trace mode determination functionality 1015A-1015N may select a tracing mode for a particular node. In one embodiment, the trace mode determination functionality 1015A-1015N may select a full tracing mode that performs full trace generation, a sparse tracing mode that performs sparse trace generation, or no trace generation (i.e., tracing disabled). In one embodiment, the tracing mode may be selected on an interaction-by-interaction basis. In one embodiment, full trace generation or sparse trace generation may be disabled for a set of services in the service-oriented system 1000. As shown in the example of FIG. 11, the trace mode determination 1015A-1015N may determine that individual nodes for services 1010A-1010N should generate traces in full tracing mode using the full trace generation 1020A-1020N. Accordingly, the services may generate full traces 1021A, 1021B, and 1021N and provide those traces to the trace analysis system 1060. Using the techniques discussed above for generating routes, the trace analysis system 1060 may use a route generation functionality 1064 to create routes based on the full trace data to be stored using the route storage 1065.

In one embodiment, a root node for an interaction may decide to generate a trace in full tracing mode, and the decision may be propagated to downstream nodes using any suitable technique(s). For example, the trace header for a trace may include metadata that instructs downstream nodes to perform full tracing. Alternatively, each node may decide independently to perform full tracing based on analysis of trace metadata, where each node implements the same policy and accordingly reaches the same decision for a particular trace. To apply the policy, each node may apply a bitmask to trace metadata (e.g., a trace identifier) to determine whether one or more bits in a particular segment of the trace metadata represent full tracing, sparse tracing, or no tracing. The bitmask-based policy enforcement may also determine whether to store a trace locally, whether to push the trace data to the trace analysis system, and/or other suitable decisions relating to generating and storing traces.

Figure 12:
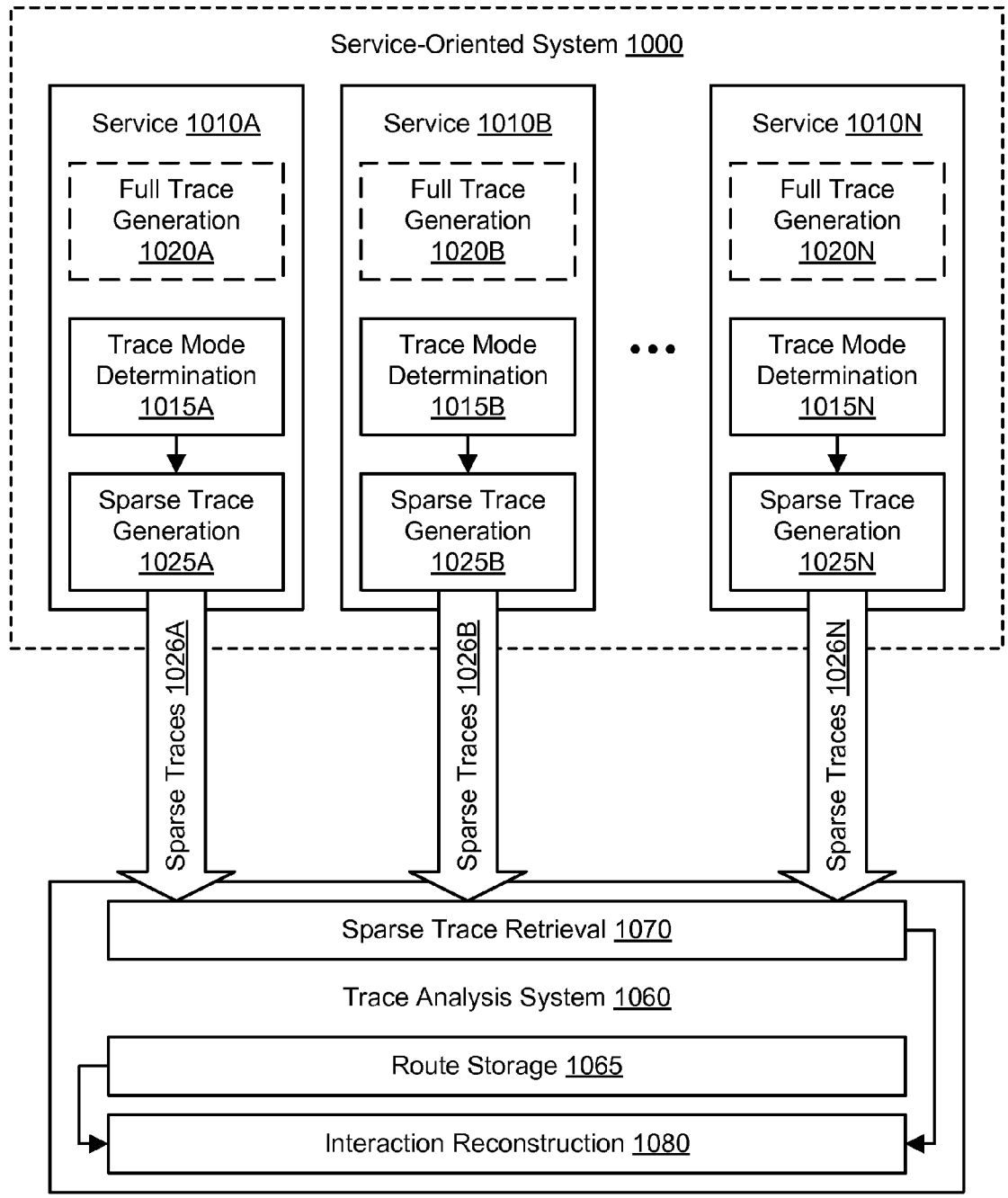
FIG. 12 illustrates further aspects of the example system environment for interaction reconstruction in a service-oriented system, including trace mode determination for sparse trace generation, according to some embodiments.

FIG. 12 illustrates further aspects of the example system environment for interaction reconstruction in a service-oriented system, including trace mode determination for sparse trace generation, according to some embodiments. As discussed above, the full trace generation 1020A-1020N may generate full traces and propagate them to downstream nodes, while the sparse trace generation 1025A-1025N may generate sparse traces and propagate them to downstream nodes. In one embodiment, individual nodes may include a trace mode determination functionality that selects a tracing mode for a particular node, e.g., on an interaction-by-interaction basis. As shown in the example of FIG. 12, the trace mode determination 1015A-1015N may determine that individual nodes for services 1010A-1010N should generate traces in sparse tracing mode using the sparse trace generation 1025A-1025N. Accordingly, the services may generate sparse traces 1026A, 1026B, and 1026N and provide those traces to the trace analysis system 1060.

In one embodiment, a root node for an interaction may decide to generate a trace in sparse tracing mode, and the decision may be propagated to downstream nodes using any suitable technique(s). For example, the trace header for a trace may include metadata that instructs downstream nodes to perform sparse tracing. Alternatively, each node may decide independently to perform sparse tracing based on analysis of trace metadata, where each node implements the same policy and accordingly reaches the same decision for a particular trace. To apply the policy, each node may apply a bitmask to trace metadata (e.g., a trace identifier) to determine whether one or more bits in a particular segment of the trace metadata represent full tracing, sparse tracing, or no tracing. The bitmask-based policy enforcement may also determine whether to store a trace locally, whether to push the trace data to the trace analysis system, and/or other suitable decisions relating to generating and storing traces.

Figure 13:
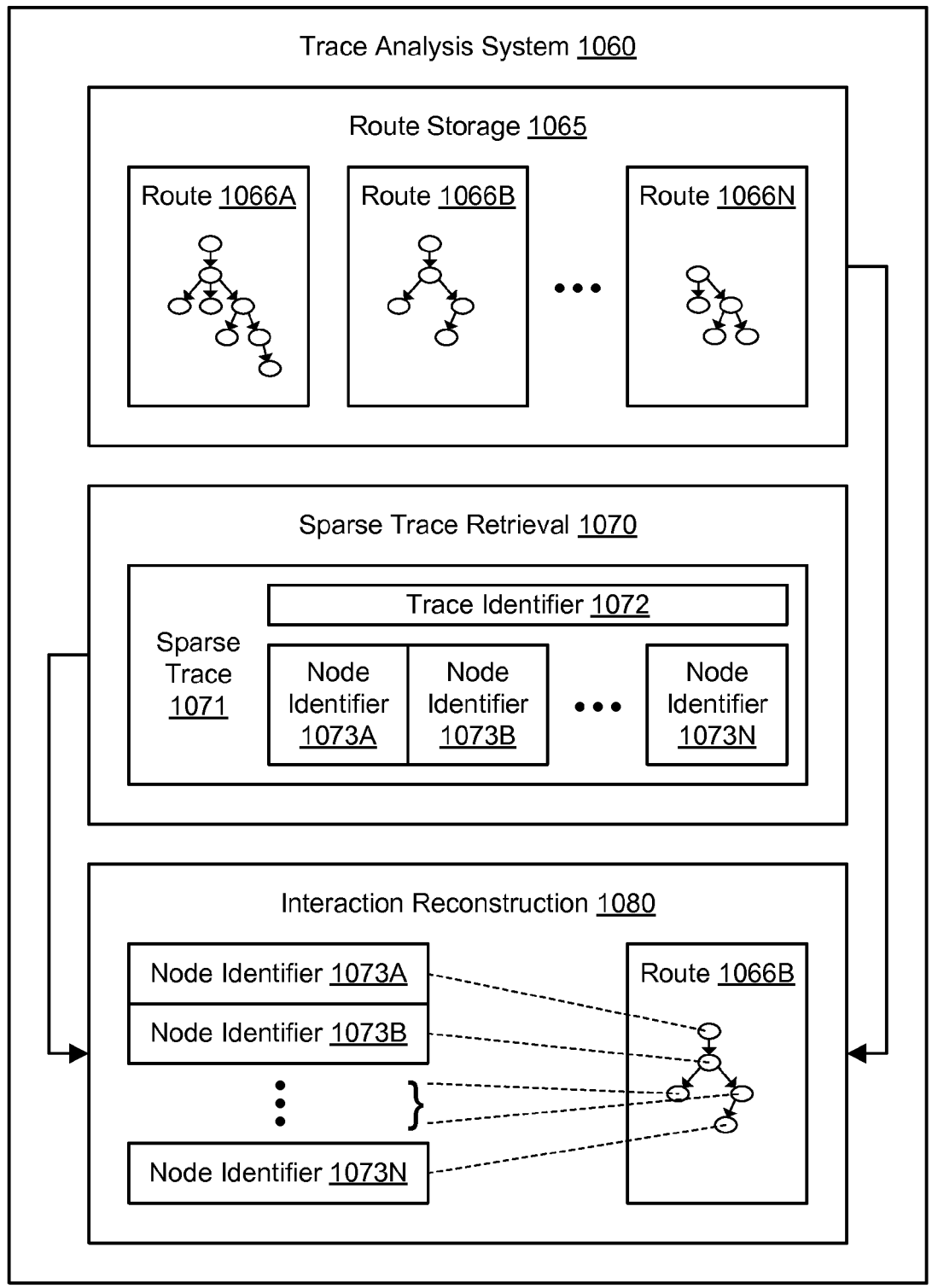
FIG. 13 illustrates further aspects of the example system environment for interaction reconstruction in a service-oriented system, including matching of a sparse trace to a stored route, according to some embodiments.

FIG. 13 illustrates further aspects of the example system environment for interaction reconstruction in a service-oriented system, including matching of a sparse trace to a stored route, according to some embodiments. As discussed above, the route storage functionality 1065 may store a plurality of predetermined routes. As shown in the example of FIG. 13, the route storage 1065 may store route 1066A and 1066B through 1066N. In one embodiment, each of the routes 1066A-1066N may represent a different directed graph of services nodes and directed interactions. In one embodiment, each of the stored routes 1066A-1066N may represent a call graph that is unique relative to the other stored routes 1066A-1066N. However, it is contemplated that any suitable number and configuration of routes may be stored by the trace analysis system 1060. Each of the nodes in one of the routes 1066A-1066N may be represented by a node identifier. The node identifiers may represent identifiers of particular compute instances, service names, service instances, and/or any other data usable to identify a particular node in a trace, including IP addresses of nodes.

The sparse trace retrieval functionality 1070 may receive or assemble one or more sparse traces such as sparse trace 1071. In one embodiment, the sparse trace retrieval functionality 1070 may receive or assemble sparse traces in response to a request from a user or other component. The sparse trace 1071 may include a trace identifier 1072. The trace identifier 1072 may link various elements of sparse trace data to the same sparse trace 1071. The sparse trace 1071 may also include a plurality of node identifiers such as node identifiers 1073A and 1073B through 1073N. However, it is contemplated that any suitable number and configuration of node identifiers may be part of a sparse trace. The node identifiers 1073A-1073N may represent identifiers of particular compute instances, service names, service instances, and/or any other data usable to identify a particular node in a trace, including IP addresses of nodes.

The interaction reconstruction functionality 1080 may attempt to match a particular sparse trace (such as sparse trace 1071) to one or more of the stored routes 1066A-1066N. In one embodiment, the interaction reconstruction functionality 1080 may compare the node identifiers 1073A-1073N in the sparse trace 1071 to the node identifiers in the stored routes 1066A-1066N. As shown in the example of FIG. 13, the interaction reconstruction functionality 1080 may determine that the nodes in the sparse trace 1071 match the nodes in the route 1066B. Accordingly, the interaction reconstruction functionality 1080 may determine that the relationships among the nodes in the sparse trace 1071 are the same as the relationships of the nodes in the stored route 1066B, e.g., the directed edges in the call graph are the same. In this manner, the interaction reconstruction functionality 1080 may determine a probable route for the nodes in the sparse trace 1071. The matching route 1066B may represent an approximate interaction reconstruction. In one embodiment, the interaction reconstruction functionality 1080 may determine that there are no matching routes for a particular sparse trace. In one embodiment, the interaction reconstruction functionality 1080 may determine that there are multiple matching routes for a particular sparse trace; the interaction reconstruction functionality 1080 may present all the matches to a user, potentially along with any statistical analysis for the likelihood that each of the matches is correct.

Figure 14:
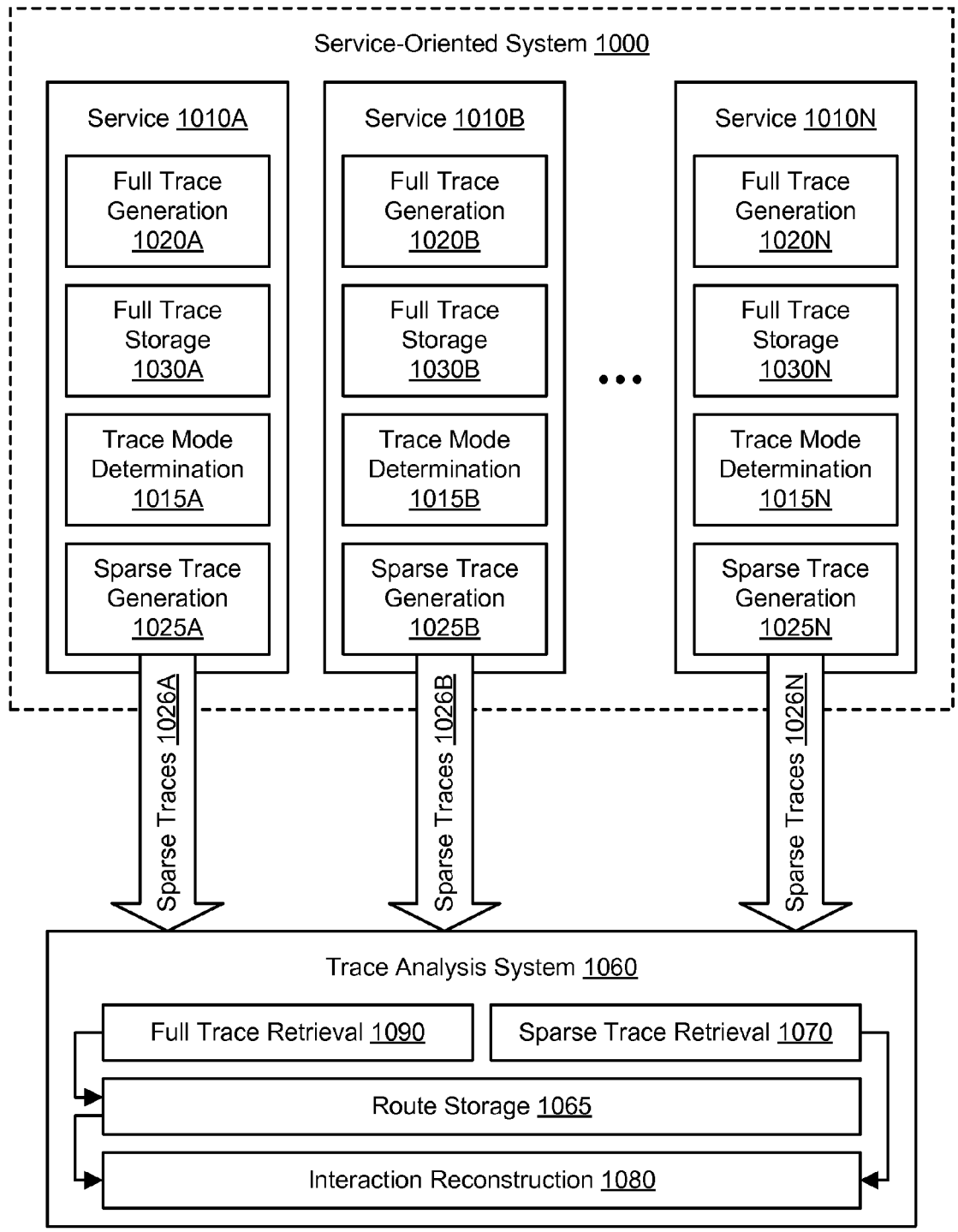
FIG. 14 illustrates further aspects of the example system environment for interaction reconstruction in a service-oriented system, including storage of full traces using local storage at service hosts while providing sparse traces to a trace analysis system, according to some embodiments.

FIG. 14 illustrates further aspects of the example system environment for interaction reconstruction in a service-oriented system, including storage of full traces using local storage at service hosts while providing sparse traces to a trace analysis system, according to some embodiments. In one embodiment, the trace data generated at particular services may be stored using storage resources that are local to the particular services. Accordingly, as shown in FIG. 14, service 1010A may include a full trace storage functionality 1030A, service 1010B may include a full trace storage functionality 1030B, and service 1010N may include full a trace storage functionality 1030N. The full trace storage functionality 1030A, 1030B, or 1030N at a particular service 1010A, 1010B, or 1010N may be used to store trace data generated by the full trace generation functionality 1020A, 1020B, 1020N at the particular service. In one embodiment, the full trace storage 1030A-1030N may include or use locally accessible storage resources, e.g., persistent storage resources managed by a host that implements one or more services. For example, the full trace storage 1030A-1030N may include or use disk drives at the hosts that implement the services 1010A-1010N. In one embodiment, the full trace storage 1030A-1030N may include or use network-attached storage or other network-accessible storage resources that are exclusively used by particular service hosts. The local storage of trace data may be configurable by host, by service, and/or on any other suitable basis.

The service-oriented system 1000 may thus implement distributed storage of trace data. In one embodiment, selected elements of the stored trace data may be retrieved from the locally accessible storage upon request from a centralized component such as the trace analysis system 1060. When the trace analysis system 1060 seeks to retrieve one or more stored traces from the services 1010A-1010N, a full trace retrieval functionality 1090 of the trace analysis system 1060 may interact with one or more of the services 1010A-1010N to request the desired trace data. Using any suitable interface(s), the trace retrieval functionality 1090 of the trace analysis system 1060 may specify any suitable identifying information to obtain trace data stored using the full trace storage 1030A-1030N. For example, the trace retrieval functionality 1090 may specify a trace identifier to obtain trace events that have that trace identifier.

In one embodiment, one or more of the services 1010A-1010N may also provide sparse trace data to the trace analysis system. As shown in the example of FIG. 14, service 1010A may provide sparse traces 1026A, service 1010B may provide sparse traces 1026B, and service 1010N may provide sparse traces 1026N. The sparse traces may be generated more frequently than the full traces (e.g., for substantially all interactions or for substantially all interactions for which full traces are not generated), but a sparse trace may be smaller in size than the corresponding full trace. By using the network(s) 190 to transmit only selected full trace data and not all of the full trace data from the services 1010A-1010N to the trace analysis system 1060, network resources may be used more efficiently.

Figure 15:
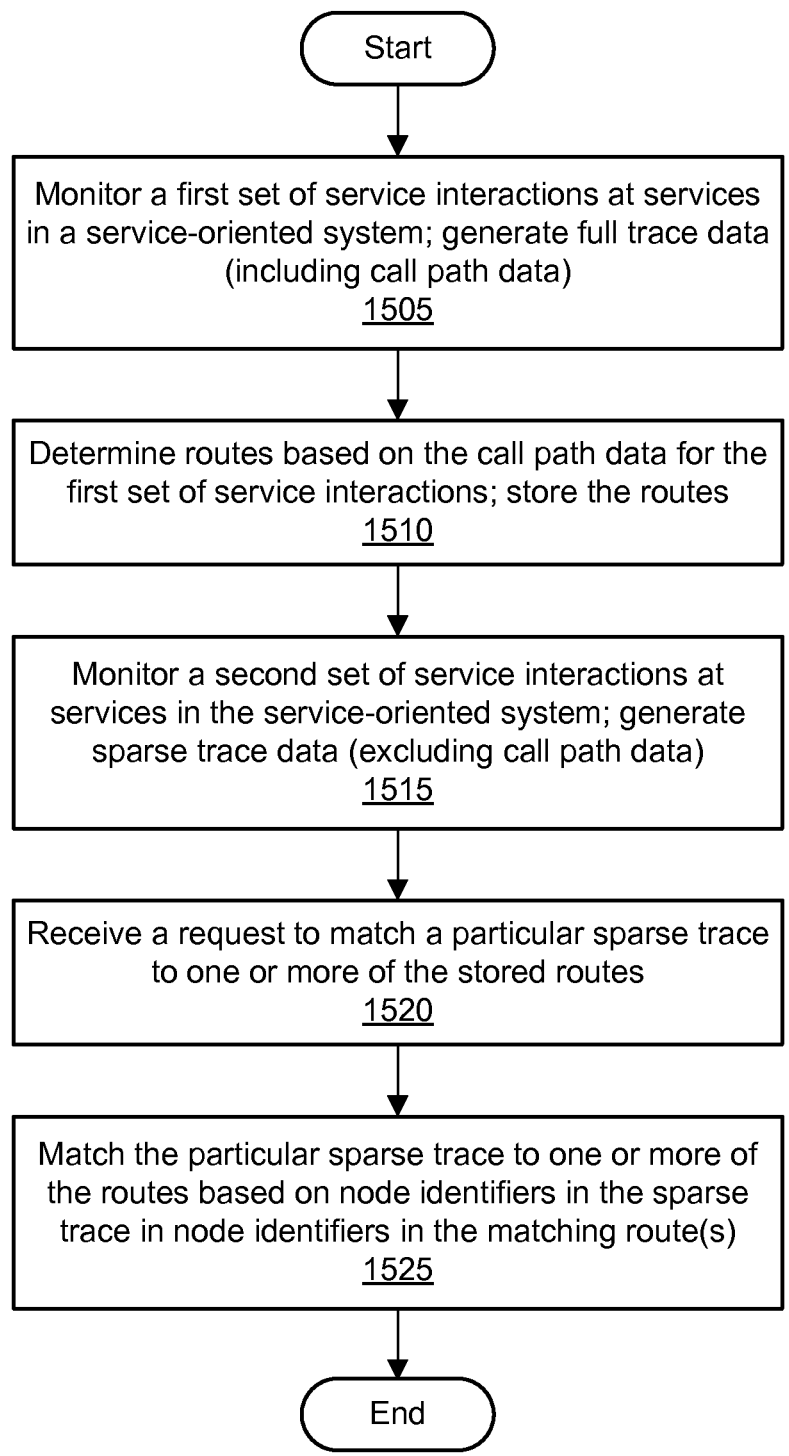
FIG. 15 is a flowchart illustrating a method for interaction reconstruction in a service-oriented system, according to some embodiments.

FIG. 15 is a flowchart illustrating a method for interaction reconstruction in a service-oriented system, according to some embodiments. As shown in 1505, a first set of service interactions may be monitored at services in a service-oriented system. The service interactions may be monitored in a full tracing mode, and full trace data may be generated for the interactions. The full trace data may include call path data or other connectivity information along with node identifiers for the various service nodes that interact with one another. In various embodiments, the full trace data may be sampled or may be generated for substantially all interactions over a period of time. The full trace data may be pushed to a centralized component such as a trace analysis system or provided to the trace analysis system upon request.

As shown in 1510, a plurality of routes may be determined based on the full trace data. In one embodiment, the routes may be determined based (at least in part) in the call path data or other connectivity information in the full trace data. The routes may be determined and stored by a centralized component such as the trace analysis system.

As shown in 1515, a second set of service interactions may be monitored at services in the service-oriented system. The service interactions may be monitored in a sparse tracing mode, and sparse trace data may be generated for the interactions. The sparse trace data may include node identifiers for the various service nodes that interact with one another. The sparse trace data may exclude call path data or other connectivity information for at least some of the nodes. The sparse trace data may include only incomplete call path data or other connectivity information (relative to the full trace data) for one or more nodes. For example, the sparse trace data may include transaction depth information for interactions at one or more nodes but may exclude other call path data or connectivity data. The sparse trace data may also exclude more detailed elements of the full trace data, such as performance metrics, for at least some of the nodes. In one embodiment, the sparse trace data may be generated for substantially all interactions or for substantially all interactions for which full trace data is not generated. The sparse trace data may be pushed to a centralized component such as a trace analysis system or provided to the trace analysis system upon request.

As shown in 1520, a request may be received to match a particular sparse trace to one or more of the stored routes. For example, the request may be received at the trace analysis system from a user or other component. The request may specify a trace identifier, and the trace analysis system may obtain elements of sparse trace data from one or more service nodes based on the trace identifier. Alternatively, the decision to match a particular sparse trace to one or more of the stored routes may be reached as part of a scheme to perform proactive matching, e.g., without receiving a specific request for a particular sparse trace from a user.

As shown in 1525, the particular sparse trace may be matched to one or more of the stored routes. The match may be made based on the node identifiers in the particular sparse trace and the node identifiers in the stored routes. In one embodiment, the match may be determined by the trace analysis system, e.g., in response to the request. In this manner, the trace analysis system may provide an approximate interaction reconstruction for a sparse trace while eliminating the need to use computational, network, and memory resources to store full traces for every interaction.

The operations shown in FIG. 15 may be performed for services at service hosts in a service-oriented system. The same or similar operations as those shown in FIG. 15 may be performed for nodes that interact with one another, e.g., in a distributed system. In this manner, route information may be approximated for sparse traces generated for such nodes.

Tracking Service Requests

For clarity of description, various terms may be useful for describing elements of a call graph. Note that the following terminology may only be applicable to services and requests of a given call graph. In other words, the following terminology may only be applicable for services and requests associated with the same root request. From the perspective of a particular service, any service that calls the particular service may be referred to as a "parent service." Furthermore, from the perspective of a particular service, any service that the particular service calls may be referred to as a "child service." In a similar fashion, from the perspective of a particular request, any request from which the particular request stems may be referred to as a "parent request." Furthermore, from the perspective of a particular request, any request stemming from the particular request may be referred to as a "child request." Additionally, as used herein the phrases "request," "call," "service request" and "service call" may be used interchangeably. Note that this terminology refers to the nature of the propagation of a particular request throughout the present system and is not intended to limit the physical configuration of the services. As may sometimes be the case with service-oriented architectures employing modularity, each service may in some embodiments be independent of other services in the service-oriented system (e.g., the source code of services or their underlying components may be configured such that inter-dependencies among source and/or machine code are not present).

As described above, a given parent request may result in multiple child service calls to other services. In various embodiments of the system and method for tracking service requests, request identifiers embedded within such service calls (or located elsewhere) may be utilized to generate a stored representation of a call graph for a given request. In various embodiments, such request identifiers may be stored in log files associated with various services. For instance, a service may store identifiers for inbound requests in an inbound request log and/or store identifiers for outbound requests in an outbound request log. In various embodiments, call graph generation logic may generate a representation of a call graph from identifiers retrieved from such logs. Such representations may be utilized for diagnosing errors with request handling, providing developer support, and performing traffic analysis.

Figure 16:
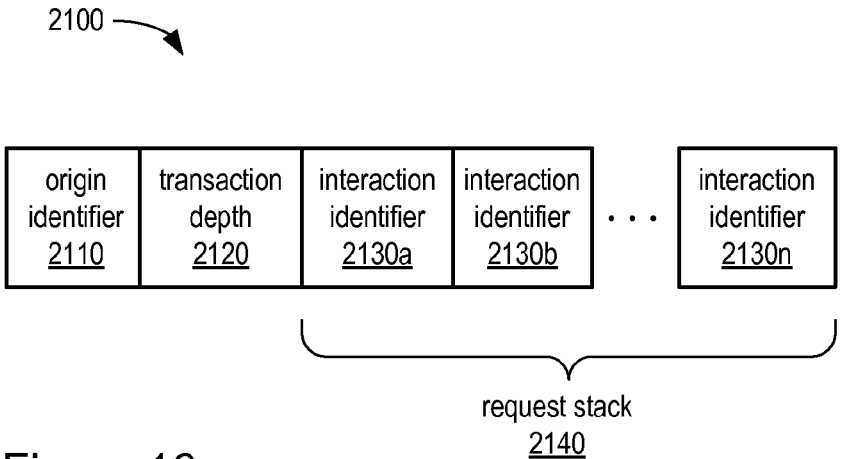
FIG. 16 illustrates an example format of a request identifier, according to some embodiments.

FIG. 16 illustrates an example format for a request identifier 2100 of various embodiments. As described in more detail below, request identifiers of the illustrated format may be passed along with service requests. For instance, a service that calls another service may embed in the call an identifier formatted according to the format illustrated by FIG. 16. For example, a requesting service may embed a request identifier within metadata of a request. In various embodiments, embedding a request identifier in a service request may include embedding within the service request, information that specifies where the request identifier is located (e.g., a pointer or memory address of a location in memory where the request identifier is stored). The various components of the illustrated request identifier format are described in more detail below.

An origin identifier (ID) 2110 may be an identifier assigned to all requests of a given call graph, which includes the initial root request as well as subsequent requests spawned as a result of the initial root request. For example, as described above, the service-oriented systems of various embodiments may be configured to process requests from various internal or external systems, such as client computer systems or computer systems consuming networked-based services. To fulfill one of such requests, the service-oriented system may call multiple different services. For instance, service "A" may be the initial service called to fulfill a request (e.g., service "A" may be called by an external system). To fulfill the initial request, service "A" may call service "B," which may call service "C," and so on. Each of such services may perform a particular function or quantum of work in order to fulfill the initial request. In various embodiments, each of such services may be configured to embed the same origin identifier 2110 into a request of (or call to) another service. Accordingly, each of such requests may be associated with each other by virtue of containing the same origin identifier. As described in more detail below, the call graph generation logic of various embodiments may be configured to determine that request identifiers having the same origin identifier are members of the same call graph.

The manner in which the origin identifier may be represented may vary according to various embodiments and implementations. One particular example of an origin identifier may include a hexadecimal string representation of a standard Universally Unique Identifier (UUID) as defined in Request for Comments (RFC) 4122 published by the Internet Engineering Task Force (IETF). In one particular embodiment, the origin identifier may contain only lower-case alphabetic characters in order to enable fast case-sensitive comparison of request identifiers (e.g., a comparison performed by the call graph generation logic described below). Note that these particular examples are not intended to limit the implementation of the origin ID. In various embodiments, the origin ID may be generated according to other formats.

Transaction depth 2120 may indicate the depth of a current request within the call graph. For instance (as described above), service "A" may be the initial service called to fulfill a root request (e.g., service "A" may be called by an external system). To fulfill the initial request, service "A" may call service "B," which may call service "C," and so on. In various embodiments, the depth of the initial request may be set to 0. For instance, when the first service or "root" service receives the root service request, the root service (e.g., service "A") may set the transaction depth 120 to 0. If in response to this request the originating service calls one or more other services, the transaction depth for these requests may be incremented by 1. For instance, if service "A" were to call two other services "B1" and "B2," the transaction depth of the request identifiers passed to such services would be equivalent to 1. The transaction depth for request identifiers of corresponding requests sent by B1 and B2 would be incremented to 2 and so on. In the context of a call graph, the transaction depth of a particular request may in various embodiments represent the distance (e.g., number of requests) between that request and the root request. For example, the depth of the root request may be 0, the depth of a request stemming from the root request may be 1, and so on. Note that in various embodiments, such numbering system may be somewhat arbitrary and open to modification.

The manner in which the origin identifier may be represented may vary according to various embodiments and implementations. One particular example of a transaction depth may be represented as a variable-width base-64 number. In various embodiments, the value of a given transaction depth may be but need not be a value equivalent to the increment of the previous transaction depth. For instance, in some embodiments, each transaction depth may be assigned a unique identifier, which may be included in the request identifier instead of the illustrated transaction depth 2120.

Interaction identifiers 2130a-2130n, collectively referred to as interaction identifier(s) 2130, may each identify a single request (or service call) for a given call graph. For instance (as described above), service "A" may be the initial service called to fulfill a request (e.g., service "A" may be called by an external system). To fulfill the root request, service "A" may call service "B," which may call service "C," and so on. In one example, the call of service "B" by service "A" may be identified by interaction identifier 2130*a*, the call of service "C" by service "B" may be identified by interaction identifier 2130*b* and so on.

Note that in various embodiments separate service requests between the same services may have separate and unique interaction identifiers. For example, if service "A" calls service "B" three times, each of such calls may be assigned a different interaction identifier. In various embodiments, this characteristic may ensure that the associated request identifiers are also unique across service requests between the same services (since the request identifiers include the interactions identifiers).

Note that in various embodiments the interaction identifier may be but need not be globally unique (e.g., unique with respect to all other interaction identifiers). For instance, in some embodiments, a given interaction identifier for a given request need be unique only with respect to request identifiers having a particular origin identifier 2110 and/or a particular parent interaction identifier, which may be the interaction identifier of the request preceding the given request in the call graph (i.e., the interaction identifier of the request identifier of the parent service). In one example, if service "A" were to call two other services "B1" and "B2," the request identifier of service "B1" and the request identifier of service "B2" would have separate interaction identifiers. Moreover, the parent interaction identifier of each of such interaction identifiers may be the interaction identifier of the request identifier associated with the call of service "A." The relationship between interaction identifiers and parent interaction identifiers is described in more detail below.

In various embodiments, interaction identifiers may be generated randomly or pseudo-randomly. In some cases, the values generated for an interaction identifier may have a high probability of uniqueness within the context of parent interaction and/or a given transaction depth. In some embodiments, the size of the random numbers that need to be generated depends on the number of requests a service makes.

Request stack 2140 may include one or more of the interaction identifiers described above. In various embodiments, the request stack may include the interaction identifier of the request to which the request identifier belongs. In some embodiments, the request stack may also include other interaction identifiers, such as one or more parent interaction identifiers of prior requests (e.g., a "stack" or "history" of previous interaction identifiers in the call graph). In various embodiments, the request stack may have a fixed size. For instance, the request stack 2140 may store a fixed quantity of interaction identifiers including the interaction identifier of the request to which the request identifier belongs and one or more parent interaction identifiers.

In various embodiments, the utilization of a request stack having a fixed length (e.g., fixed quantity of stored interaction identifiers) may provide a mechanism to control storage and bandwidth throughout the service-oriented system. For example, the service-oriented system of various embodiments may in some cases receive numerous (e.g., thousands, millions, or some other quantity) of service requests per a given time period (e.g., per day, per week, or some other time period), such as requests from network-based browsers (e.g., web browsers) on client systems or requests from computer systems consuming network-based services (e.g., web services). In some embodiments, a request identifier adhering to the format of request identifier 2100 may be generated for each of such requests and each of any subsequent child requests. Due to the sheer number of requests that may be handled by the service-oriented systems of various embodiments, even when the request stack of a single request identifier is of a relatively small size (e.g., a few bytes), the implications on storage and bandwidth of the overall system may in some cases be significant. Accordingly, various embodiments may include ensuring that each request identifier contains a request stack equal to and/or less than a fixed stack size (e.g., a fixed quantity of interaction identifiers). Similarly, various embodiments may include fixing the length of each interaction identifier stored as part of the request stack (e.g., each interaction identifier could be limited to a single byte, or some other size). By utilizing interaction identifiers of fixed size and/or a request stack of a fixed size, various embodiments may be configured to control the bandwidth and/or storage utilization of the service-oriented system described herein. For instance, in one example, historical request traffic (e.g., the number of requests handled by the service oriented system per a given time period) may be monitored to determine an optimal request stack size and/or interaction identifier size in order to prevent exceeding the bandwidth or storage limitations of the service-oriented system.

In various embodiments, the utilization of a request stack having a fixed length (e.g., fixed quantity of stored interaction identifiers) may provide a mechanism to control one or more fault tolerance requirements of the system including but not limited to durability with respect to data loss and other errors (associated with individual services and host systems as well as the entire service-oriented system). For example, in some embodiments, the larger the size of the request stack (e.g., the more interaction identifiers included within a given request identifier), the more fault tolerant the system becomes.

In embodiments where request stack 2140 includes multiple interaction identifiers, the request stack may serve as a history of interaction identifiers. For instance, in the illustrated embodiment, interaction identifier 2130*a*-2130*n* may represent a series of interaction identifiers in ascending chronological order (where interaction identifier 2130*a* corresponds to the oldest service call and interaction identifier 2130*n* corresponds to the most recent service call).

In addition to the illustrated elements, request identifier 2100 may in various embodiments include one or more portions of data for error detection and/or error correction. Examples of such data include but are not limited to various types of checksums.

Figure 17:
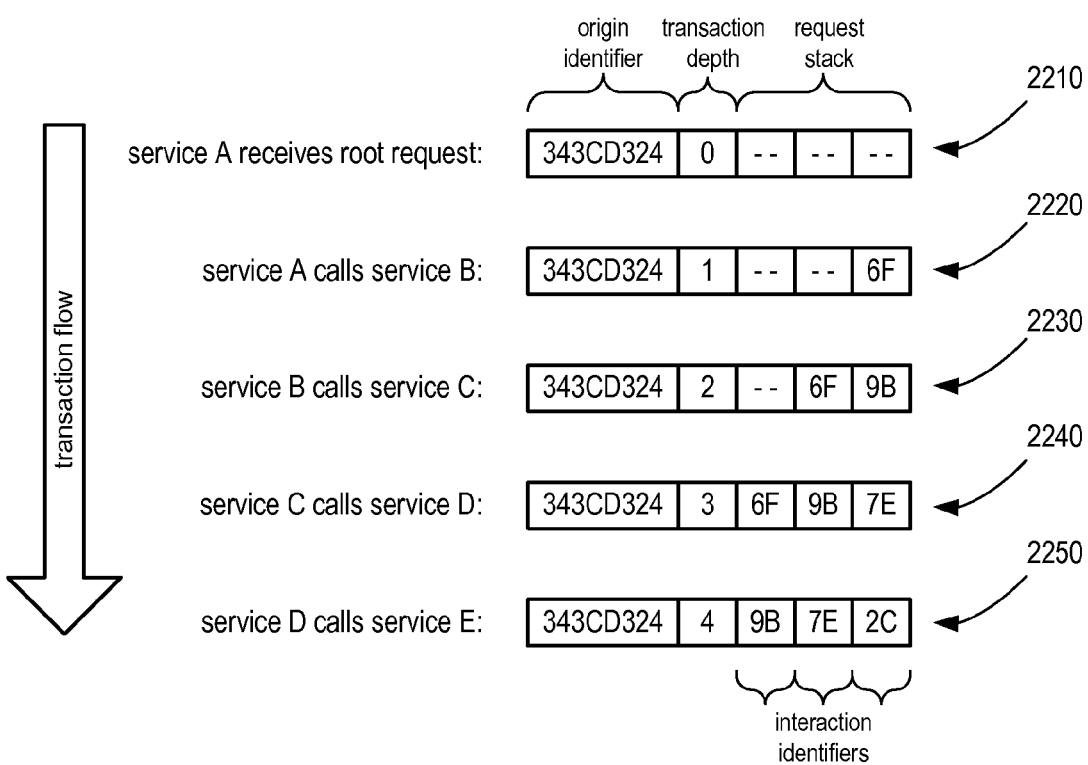
FIG. 17 illustrates an example transaction flow for fulfilling a root request, according to some embodiments.

FIG. 17 illustrates an example transaction flow for a root request and multiple child requests associated with the same root request. As illustrated, the transaction flow may begin with the receipt of a root request by service "A." For instance, this initial request might originate from a client computer system (e.g., from a web browser) or from another computer system requesting a service to consume. To completely fulfill the request, service "A" may perform some quantum of work and/or request the services of another service, such as service "B" (see, e.g., request identifier 2220). Service "B" may call another service "C" (see, e.g., request identifier 2230) and so on as illustrated (see, e.g., request identifiers 2240-2250). As illustrated, since each request identifier 2210-2250 corresponds to a request of the same transaction, each of such request identifiers include the same origin identifier "343CD324." For instance, each of services A-D may embed such origin identifier within each of such request identifiers (described in more detail with respect to FIG. 18). Furthermore, in the illustrated embodiment, the request identifier corresponding to the initial service request includes a transaction depth of 0 since the request identifier is a parent request identifier, as described above. Each subsequent child request identifier includes a transaction identifier equivalent to the previous requests transaction depth plus an increment value. In other embodiments, instead of incremented values, the transaction depths may be values that uniquely identify a transaction depth with respect to other depths of a given call graph; such values may but need not be increments of each other.

In the illustrated example, each request identifier 2210-2250 includes a request stack of a fixed size (e.g., three interaction identifiers). In other embodiments, larger or smaller request stacks may be utilized as long as the request stack includes at least one interaction identifier. Furthermore, in some embodiments, request stack sizes may be of uniform size across the service-oriented system (as is the case in the illustrated embodiment). However, in other embodiments, subsets of services may have different request stack sizes. For instance, a portion of the service-oriented system may utilize a particular fixed stack size for request identifiers whereas another portion of the service-oriented system may utilize another fixed stack fixed stack size for request identifiers.

Figure 18:
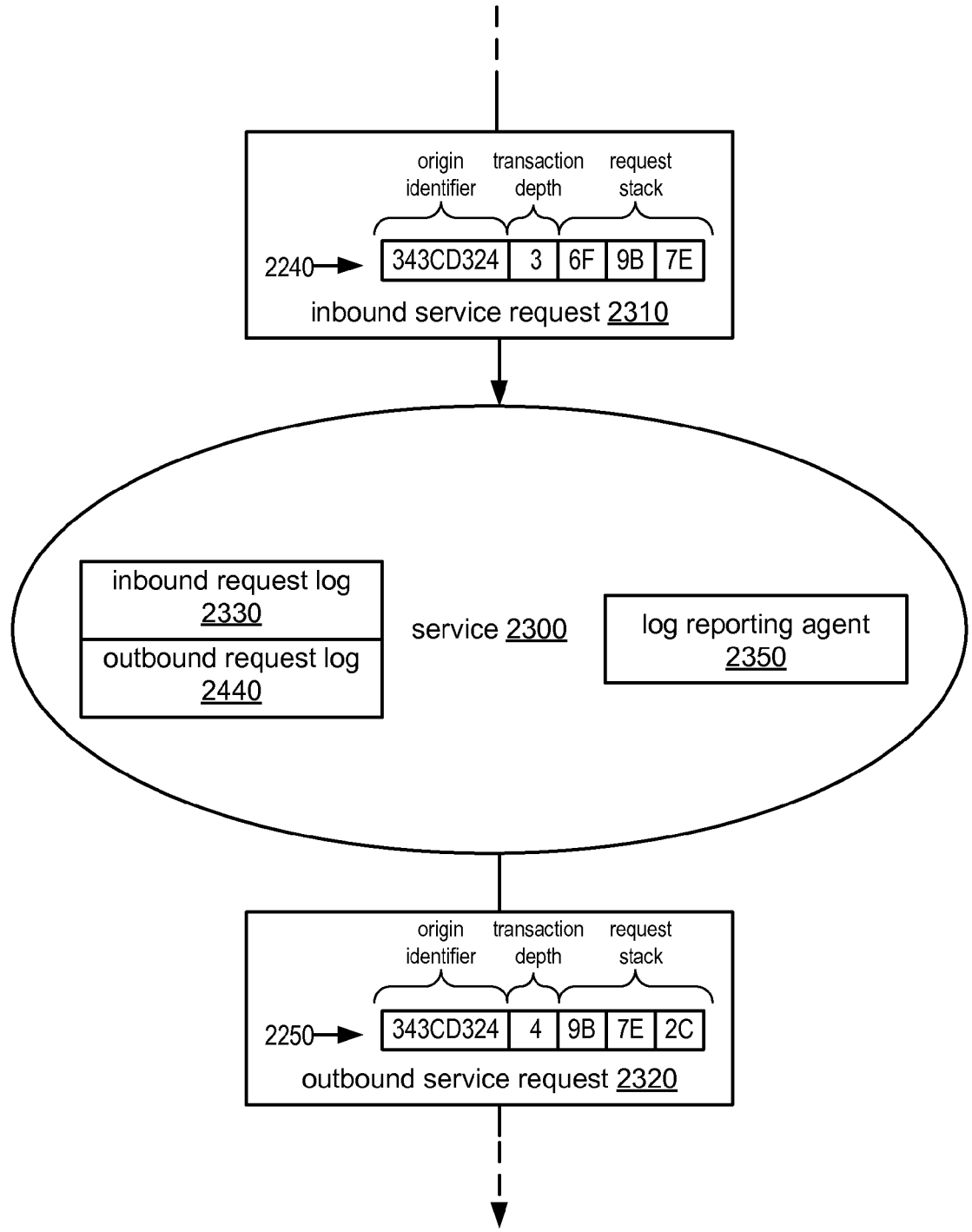
FIG. 18 illustrates one example of a service of a service-oriented system, according to some embodiments.

Referring collectively to FIG. 17 and FIG. 18, a representation of the receipt of an inbound service request (or service call) 2310 as well as the issuance of an outbound request 2320 by service 2300 is illustrated. Request identifiers 2240 and 2250 of FIG. 18 may correspond to the like-numbered elements of FIG. 17. As illustrated, service 2300 may receive an inbound service request 2310. Service 2300 may receive the inbound service request from another service within the service-oriented system, according to various embodiments. Inbound service request 2310 may include the requisite instructions or commands for invoking service 2300. In various embodiments, inbound service request 2310 may also include a request identifier 2240, which may include values for an origin identifier, transaction depth, and request stack, as described above with respect to FIG. 17. In various embodiments, request identifier 2240 may be embedded within inbound service request 2310 (e.g., as metadata). For example, according to various embodiments, the request identifier may be presented as part of metadata in a service framework, as part of a Hypertext Transfer Protocol (HTTP) header, as part of a SOAP header, as part of a Representational State Transfer (REST) protocol, as part of a remote procedural call (RPC), or as part of metadata of some other protocol, whether such protocol is presently known or developed in the future. In other embodiments, request identifier 2240 may be transmitted to service 2300 as an element separate from inbound service request 2310. In various embodiments, request identifier 2240 may be located elsewhere and inbound service request 2310 may include information (e.g., a pointer or memory address) for accessing the request identifier at that location.

In response to receiving the inbound service request, service 2300 may perform a designated function or quantum of work associated with the request, such as processing requests from client computer systems or computer systems requesting web services. In various embodiments, service 2300 may be configured to store a copy of request identifier 2240 within inbound log 2330. In some cases, service 2300 may require the services of another service in order to fulfill a particular request, as illustrated by the transmission of outbound service request 2320.

As is the case in the illustrated embodiment, service 2300 may be configured to send one or more outbound service requests 2320 to one or more other services in order to fulfill the corresponding root request. Such outbound service requests may also include a request identifier 2250 based at least in part on the received request identifier 2240. Request identifier 2250 may be generated by service 2300 or some other component with which service 2300 is configured to coordinate. Since outbound service request 2320 is caused at least in part by inbound service request 2310 (i.e., request 2320 stems from request 2310), the outbound service request 2320 and the inbound service request 2310 can be considered to be constituents of the same call graph. Accordingly, service 2300 (or some other component of the service-oriented framework) may be configured to generate request identifier 2250 such that the request identifier includes the same origin identifier as that of the inbound service request 2310. In the illustrated embodiment, such origin identifier is illustrated as "343CD324." For instance, in one embodiment, service 2300 may be configured to determine the value of the origin identifier of the request identifier of the inbound service request and write that same value into the request identifier of an outbound service request. In various embodiments, service 2300 (or some other component of the service-oriented framework) may also be configured to generate request identifier 2250 such that the request identifier includes a transaction depth value that indicates the transaction depth level is one level deeper than the transaction depth of the parent request (e.g., inbound service request 2310). For instance, in one embodiment, any given call graph may have various depths that each have their own depth identifier. In some embodiments, such depth identifiers may be sequential. Accordingly, in order to generate request identifier 2250 such that it includes a transaction depth value that indicates the transaction depth level is one level deeper than the transaction depth of the parent request (e.g., inbound service request 2310), service 2300 may be configured to determine the value of the transaction depth from the parent request, sum that value with an increment value (e.g., 1, or some other increment value), and store the result of such summation as the transaction depth value of the request identifier of the outbound service request. In the illustrated embodiment, the transaction depth value of the inbound request identifier 2240 is 3 whereas the transaction depth value of the outbound request identifier 2250 is 4.

In some cases, transaction depth identifiers may instead have identifiers that are not necessarily related to each other sequentially. Accordingly, in some embodiments, service 2300 may be configured to determine the transaction depth value from the request identifier of the parent request. From that value, service 2300 may determine the actual depth level corresponding to the transaction depth value (e.g., via a lookup table that provides a sequential listing of transaction depth levels to corresponding transaction depth values). From that depth level, service 2300 may be configured to determine the next sequential transaction depth (e.g., via a lookup table that provides a sequential listing of transaction depth levels to corresponding transaction depth values) as well as the transaction depth value corresponding to that transaction depth. Service 2300 may be configured to store such transaction depth value as the transaction depth value of the request identifier of the outbound service request.

Service 2300 may also be configured to generate request identifier 2250 of the outbound service request such that the request identifier has a request stack that includes an interaction identifier associated with the outbound service request and all of the interaction identifiers of the request stack of request identifier 2240 except for the oldest interaction identifier, which in many cases may also be the interaction identifier corresponding to a request at the highest transaction depth level when compared to the transaction depth levels associated with the other interaction identifiers of the request stack. For example, the root request may occur at transaction depth "0," a subsequent request may occur at transaction depth "1," another subsequent request may occur at transaction depth "2," and so on. In some respects, the request stack may operate in a fashion similar to that of a first in, first out (FIFO) buffer, as described in more detail below.

To generate the request stack of request identifier 2250, service 2300 may be configured to determine the interaction identifiers present within the request stack of request identifier 2240. Service 2300 may also be configured to determine the size of the request stack that is to be included within request identifier 2250 (i.e., the quantity of interaction identifiers to be included within the request stack). In some embodiments, this size may be specified by service 2300, another service within the service-oriented system (e.g., the service that is to receive request 2320), or some other component of the service-oriented system (e.g., a component storing a configuration file that specifies the size). In other embodiments, the size of the request stack may be specified by service 2300. In one embodiment, the size of the request stack may be dynamically determined by service 2300 (or some other component of the service-oriented system). For instance, service 2300 may be configured to dynamically determine the size of the request stack based on capacity and/or utilization of system bandwidth and/or system storage. In one example, service 2300 may be configured to determine that bandwidth utilization has reached a utilization threshold (e.g., a threshold set by an administrator). In response to such determination, service 2300 may be configured to utilize a smaller request stack size in order to conserve bandwidth. In various embodiments, a similar approach may be applied to storage utilization.

Dependent upon the size of the inbound request stack and the determined size of the outbound request stack (as described above), a number of different techniques may be utilized to generate the request stack of request identifier 2250, as described herein. In one scenario, the size of the inbound request stack may be the same as the determined size of the outbound request stack, as is the case in the illustrated embodiment. In this scenario, if the size of the outbound service request stack is to be n interaction identifiers, service 2300 may be configured to determine the (n−1) most recent interaction identifiers of the request stack of the inbound request identifier. Service 2300 may be configured to embed the (n−1) most recent interaction identifiers of the inbound request stack into the request stack of the outbound request identifier 2250 in addition to a new interaction identifier that corresponds to request 2320 issued by service 2300. In the illustrated embodiment, for each request identifier, the oldest interaction identifier is illustrated on the leftmost portion of the request stack and the newest interaction identifier is illustrated on the rightmost portion. In the illustrated embodiment, to generate the request stack of the outbound request identifier, service 300 may be configured to take the request stack of the inbound request identifier, drop the leftmost (e.g., oldest) interaction identifier, shift all other interaction identifiers to the left by one position, insert a newly generated interaction identifier for the outbound request, and embed this newly generated request stack in the request identifier of the outbound request.

In another scenario, the size of the request stack of the inbound service request identifier 2240 may be less than the size of the determined request stack size for the outbound service request identifier 2250. In these cases, the request stack size of the outbound service request may enable all of the interaction identifiers of the request stack of the inbound service request identifier to be included within the request stack of the outbound service request identifier. Accordingly, in various embodiments, service 2300 may be configured to embed all of the interaction identifiers in the request stack of the outbound request identifier 2250 in addition to a new interaction identifier that corresponds to request 2320 issued by service 2300.

In an additional scenario, the size of the request stack of the inbound service request identifier 2240 may be greater than the size of the determined request stack size for the outbound service request identifier 2250. For instance, if the size of the request stack for the outbound service request identifier is m interaction identifiers and the size of the request stack for the inbound request identifier is m+x interaction identifiers (where x and m are positive integers), service 2300 may be configured to determine the (m−1) most recent interaction identifiers of the request stack of the inbound request identifier. Service 2300 may also be configured to embed such (m−1) most recent interaction identifiers of the request stack of the inbound request identifier into the request stack of the outbound request identifier in addition to a new interaction identifier that corresponds to request issued by service 2300.

As described above, inbound request log 2330 may be managed by service 2300 and include records of one or more inbound service requests. In one embodiment, for each inbound service request received, service 2300 may be configured to store that request's identifier (which may include an origin identifier, transaction depth, and request stack, as illustrated) within the inbound request log. In various embodiments, service 2300 may also store within the log various metadata associated with each inbound service request identifier. Such metadata may include but is not limited to timestamps (e.g., a timestamp included within the request, such as a timestamp of when the request was generated, or a timestamp generated upon receiving the request, such as a timestamp of when the request was received by service 2300), the particular quantum of work performed in response to the request, and/or any errors encountered while processing the request. In various embodiments, outbound request log 2340 may include information similar to that of inbound request log 2330. For example, for each outbound request issued, service 2300 may store a record of such request within outbound request log 2340. For instance, service 2300 may, for each outbound request, store that request's identifier within outbound request log 2340. As is the case with inbound request log 2330, service 2300 may also store within outbound request log 2340 various metadata associated with requests including but not limited to metadata such as timestamps and errors encountered.

Figure 19:
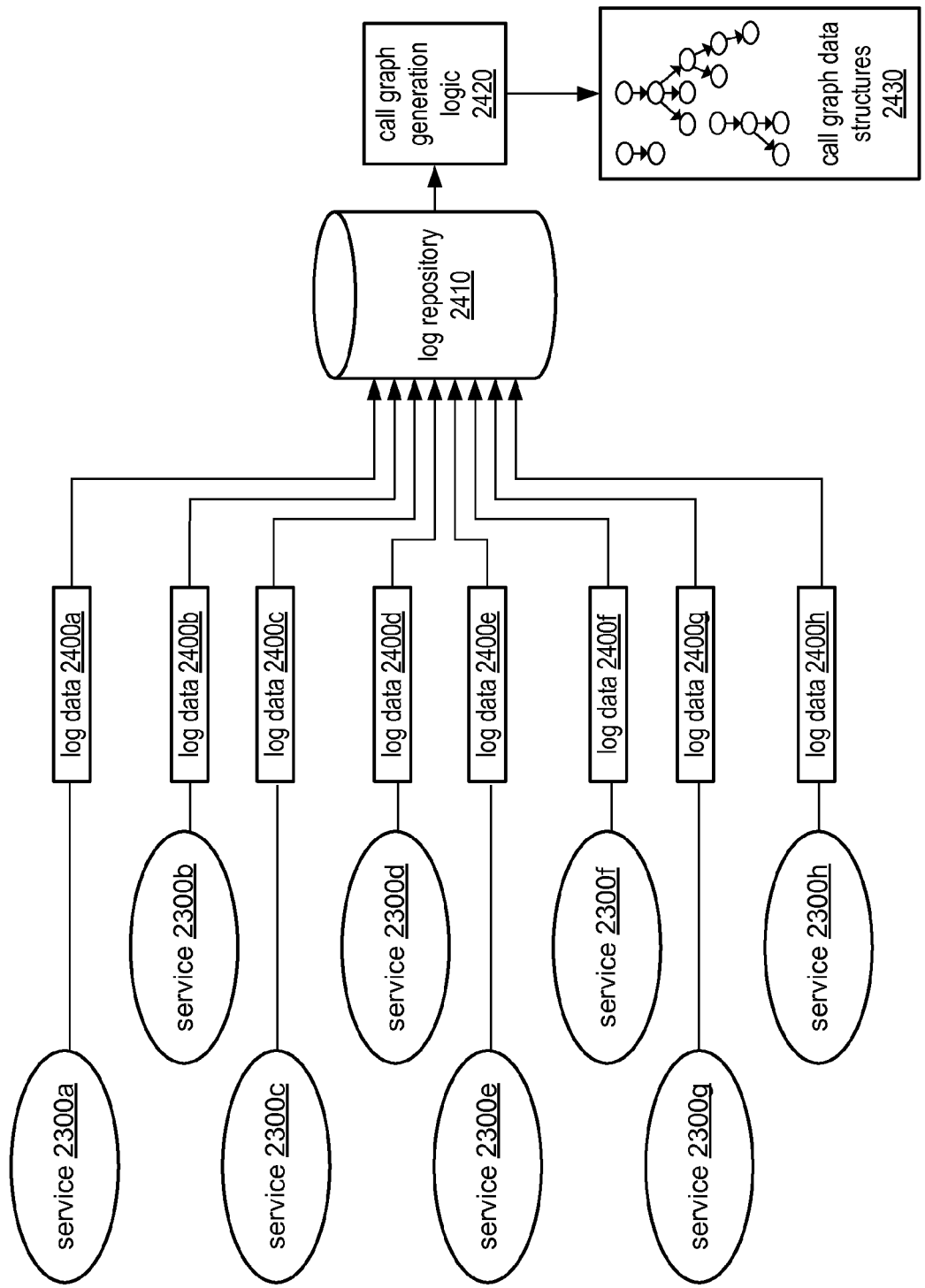
FIG. 19 illustrates an example data flow diagram for the collection of log data and generation of a call graph, according to some embodiments.

Referring collectively to FIG. 18 and FIG. 19, each service within the service-oriented system may include a log reporting agent, such as log reporting agent 2350. Log reporting agent 2350 may in various embodiments report the contents of inbound request log 2330 and/or outbound request log 2340 to a log repository (e.g., a data store, such as a database or other location in memory). One example of such a repository is illustrated log repository 2410 of FIG. 19. Various protocols for transmitting records from the logs of a service 2300 to a log repository may be utilized according to various embodiments. In some embodiments, the log reporting agent may periodically or aperiodically provide log information to the log repository. In various embodiments, the log reporting agent may be configured to service requests for log information, such as a request from the log repository or some other component of the service-oriented system. In some embodiments, in addition to or as an alternative to reporting log information from logs 2330 and 2340, log reporting agent 2350 may report log information to the log repository in real-time (in some cases bypassing the storage of information within the logs altogether). For instance, as a request is detected or generated, the log reporting agent may immediately report the information to the log repository. In various embodiments, log data may specify, for each request identifier, the service that generated the request identifier and/or the service that received the request identifier.

As illustrated in FIG. 19, multiple services 2300a-2300h within the service-oriented system may be configured to transmit respective log data 2400a-2400h to log repository 2410. The data stored within log repository 2410 (e.g., service request identifiers and associated metadata) may be accessed by call graph generation logic 2420. Call graph generation logic may be configured to generate a data structure representing one or more call graphs, such as call graph data structures 2430. As described above, the particular services called to fulfill a root request may be represented as a call graph that specifies, for a particular service called, the service that called the particular service and any services called by the particular service. For instance, since a root request may result in a service call which may propagate into multiple other services calls throughout the service oriented system, a call graph may in some cases include a deep and broad tree with multiple branches each representing a sequences of service calls.

Figure 20:
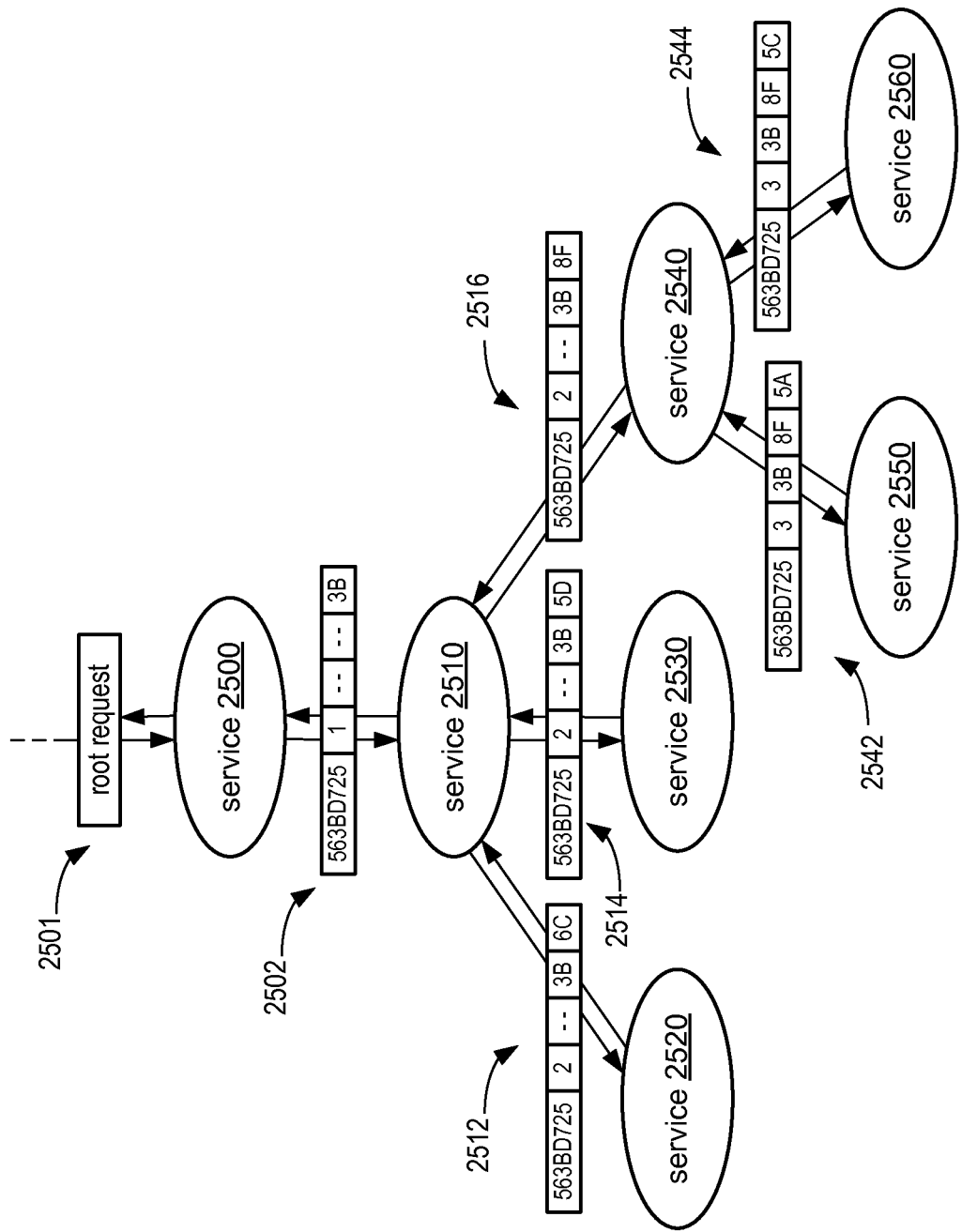
FIG. 20 illustrates an example visual representation of a call graph and request identifiers from which such call graph is generated, according to some embodiments.

FIG. 20 illustrates a visual representation of such a call graph data structure that may be generated by call graph generation logic 2420. In various embodiments, a call graph data structure may include any data structure that specifies, for a given root request, all the services called to fulfill that root request. Note that while FIG. 20 and the associated description pertain to an acyclic call graph, this representation is not inclusive of all variations possible for such a call graph. For instance, in other embodiments, a call graph may be represented by any directed graph (including graphs that include directed cycles) dependent on the nature of the service requests within the service-oriented system. Additionally, for a given one of such services, the call graph data structure may specify the service that called the given service as well as any services called by the given service. The call graph data structure may additionally indicate a hierarchy level of a particular service within a call graph. For instance, in the illustrated embodiment, service 2500 is illustrated as a part of the first level of the hierarchy, service 2510 is illustrated as part of the second level of the hierarchy and so on.

To generate such a call graph, call graph generation logic may be configured to collect request identifiers (e.g., request identifiers 2502, 2512, 2514, 2516, 2542 and 2544) that each include the same origin identifier. In the illustrated embodiment, "563BD725" denotes an example of such an origin identifier. In various embodiments, call graph generation logic may mine (e.g., perform a search or other data analysis) log data associated with various services in order to find a collection of request identifiers that correspond to the same origin identifier (and thus correspond to the same root request, e.g., root request 2501).

In various embodiments, inbound and outbound request logs may be maintained for each service. In these cases, call graph generation logic 2420 may be configured to compare request identifiers in order to determine that a given service called another service in the process of fulfilling the root request. For example, in one embodiment, the call graph generation logic may compare a request identifier from a given service's outbound request log to the request identifier from another service's inbound request log. If a match is detected, the call graph generation logic may indicate that the service corresponding to that outbound request log called the service corresponding to that inbound request log. For example, call graph generation logic may discover a request identifier equivalent to request identifier 2502 within the outbound request log associated with service 2500. In this example, call graph generation logic may also locate a request identifier equivalent to request identifier 2502 within the inbound log of service 2510. In response to this match, call graph generation logic may indicate that an edge (representing a service call) exists between two particular nodes of the call graph (e.g., the node corresponding to service 2500 and the node corresponding to service 2510). The above-described process may be repeated to determine the illustrated edges that correspond to request identifiers 2512, 2514, 2516, 2542 and 2544. In other embodiments, since the manner in which interaction identifiers are generated may ensure that each interaction identifier is unique for a given depth level and origin identifier, the call graph generation logic may instead search for matching interaction identifiers between request identifiers of adjacent depth levels instead of searching for matching request identifiers.

In other embodiments, only one type of log (e.g., either inbound or outbound) may be maintained for a given service. For example, if only outbound request logs are maintained for each of the services, then the call graph generation logic 2420 may utilize different techniques for determining an edge that represents a service call in the call graph data structure. In one example, call graph generation logic may compare two request identifiers that have adjacent depth values. For instance, in the illustrated embodiment, the call graph generation logic may be configured to compare request identifier 2502 to request identifier 2514, since such request identifiers contain the adjacent depth values of 1 and 2. In this case, the call graph generation logic may determine whether the most recent interaction identifier of request identifier 2502 (e.g., 3B) is equivalent to the 2nd most recent interaction identifier of request identifier 2514 (e.g., 3B). For request identifier 2514, the 2nd most recent interaction identifier is evaluated since the most recent interaction identifier position will be fill with a new interaction identifier inserted by the service that generated request identifier 2514 (in this case, service 2530). In the illustrated embodiment, this comparison returns a match since the values for the interaction identifiers are equivalent. In response to such match, the call graph generation logic may be configured to indicate within the data structure that an edge (representing a service call) exists between service 2500 and 2510.

In various embodiments, the call graph generation logic 2420 may be configured to generate a call graph in the presence of data loss. For instance, consider the case where the service oriented system maintains outbound service logs and the log data for service 2510 is lost, as might be the case in the event of a failure on the host system on which service 2510 runs or in the case of a failure of log repository 2410. Since the request identifiers of various embodiments may include a request stack of multiple interaction identifiers, multiple layers of redundancy may be utilized to overcome a log data loss. In this example, since the outbound log data for service 2510 is lost, request identifiers 2512, 2514, and

2516 may not be available. Accordingly, the call graph generation logic may be configured to utilize a request identifier from a lower depth level to reconstruct the pertinent portion of the call graph. While request identifiers 2512, 2514, and 2516 may be not be available due to data loss, the request identifier 2542 (and 2544) is available. Since request identifier 2542 includes a stack or "history" of interaction identifiers, that request identifier may be utilized to obtain information that would have been available if request identifier 2516 were not lost to data failure. Since request identifier 2542 has a depth level that is two levels lower than the depth level of request identifier 2502, the call graph generation logic may utilize the third most recent (not the second most recent as was the case in the previous example) interaction identifier. In this example, the third most recent interaction identifier is evaluated since that position would contain the interaction identifier generated by service 2500 in the illustrated embodiment. If the call graph generation logic determines that the most recent interaction identifier of request identifier 2502 matches the third most recent interaction identifier of request identifier 2542, the call graph generation logic may determine that service 2500 called service 2510 even if the log data for service 2510 is unavailable (e.g., due to data loss). Accordingly, the call graph generation logic may indicate an edge (representing a service call) exists between service 2500 and service 2510 within the generated call graph data structure.

In addition to the request identifiers described above, metadata relating to service interactions may be collected (e.g., by the log reporting agent 2350) and used in the generation of call graphs. In various embodiments, the metadata includes, but is not limited to, any of the following: a timestamp, an indication of whether the interaction is on the client side or server side, the name or other identifier of the application programming interface (API) invoked for the interaction, the host name, data that describes the environment (e.g., a version number of a production environment or test environment), and/or any other metadata that is suitable for building the call graphs and/or comparing one set of call graphs to another. The collected metadata may be used to determine a graph of service interactions, i.e., by identifying or distinguishing nodes and edges from other nodes and edges. If the metadata includes information identifying a test run and/or the version of an environment, then the metadata may enable reporting of test results (e.g., test coverage metrics and/or reports) by test run and/or environment.

In some embodiments, various metadata may also be included within such call graph data structure, such as timestamps, the particular quantum of work performed in response to a given request, and/or any errors encountered while processing a given request. For example, the illustrated services may record timestamps of when a request is received, when a request is generated, and/or when a request is sent to another service. These timestamps may be appended to the call graph data structure to designate latency times between services (e.g., by calculating the time difference between when a request is sent and when it is received). In other cases, metadata may include error information that indicates any errors encountered or any tasks performed while processing a given request. In some embodiments, such metadata may include host address (e.g., an Internet Protocol address of a host) in order to generate a graph structure that indicates which host machines are processing requests (note that in some embodiments host machines may host multiple different services).

The system and method for tracking service requests described herein may be configured to perform a variety of methods. The call graph generation logic described herein may be configured to receive multiple request identifiers, each associated with a respective one of multiple service requests. Each given request identifier may include an origin identifier associated with a root request, a depth value specifying a location of the associated service request within a sequence of service requests, and a request stack including one or more interaction identifiers assigned to a service request issued from one service to another service. For example, receiving multiple request identifiers may in some cases include receiving log data that includes such request identifiers. For instance, the call graph generation logic may receive log data directly from host systems that host the services of the service-oriented system described herein. In some cases, the call graph generation logic may receive log data from one or more log repositories such as log repository 2410 described above. In general, the call graph generation logic may utilize any of the techniques for obtaining request identifiers described above with respect to call graph generation logic 2420.

The call graph generation logic may further, based on multiple ones of the request identifiers that each include an origin identifier associated with a particular root request, generate a data structure that specifies a hierarchy of services called to fulfill that particular root request; wherein, based on one or more of the interaction identifiers and one or more of the depth values, the generated data structure specifies, for a given service of said hierarchy: a parent service that called the given service, and one or more child services called by the given service. For example, in various embodiments, generating the data structure may include determining that each of a subset of the multiple request identifiers includes the same origin identifier as well as indicating each associated service request as a node of the hierarchy within the data structure. Examples of such nodes are illustrated in FIG. 20 as services 2500, 2510, 2520, 2530, 2540, 2550 and 2560. Generating such data structure may also include, for each node within the hierarchy, assigning the node to a level within the hierarchy based on the transaction depth value of the request identifier associated with the service request corresponding to that node. Examples of such depth level values are described above with respect to transaction depth 2120 of FIG. 16. Generating the data structure may also include determining that the request stack of a given node at a given level within the hierarchy includes an interaction identifier that is the same as an interaction identifier of the request stack of another node located within an adjacent level of the hierarchy. In response to determining such match, the call graph generation logic may indicate a service call as an edge between said given node and said other node. Examples of such an edge are illustrated as the edges coupling the nodes of FIG. 20 described above.

In various embodiments, the techniques for analyzing request identifiers and generating a call graph may be performed on an incremental basis. For example, as request identifiers are updated (e.g., as logs and/or log repositories receive new data), the call graph generation logic described herein may be configured to incrementally update the generated call graph data structure to reflect the newly reported requests. In some embodiments, the techniques described herein may be performed on a depth-level basis. For example, as request identifiers are received (e.g., by the log repository or call graph generation logic described herein), each identifier may be categorized (e.g., placed in a categorized directory) based on transaction depth.

In various embodiments, the generated call graph data structures described herein may be utilized for diagnostic purposes. For instance, as described above, the call graph data structure may include metadata, such as a record of error(s) that occur when processing a request. Because this metadata may be associated with specific nodes and/or service calls, various embodiments may include determining sources of errors or faults within the service-oriented system. In some embodiments, the generated call graph data structures described herein may be utilized for analytical purposes. For example, based on call graph data structures generated as described herein, various embodiments may include determining historical paths of service calls and/or path anomalies. For instance, various embodiments may include detecting that, for a given root request, one or more services are being called unnecessarily. For instance, such services may not be needed to fulfill the particular root request. Accordingly, in some embodiments, such services may be culled from processing further requests similar to or the same as the root request that originally initiated the unnecessary service calls (e.g., a re-orchestration process may be employed to modify the particular services called for a particular type of request). By removing such unnecessary service calls, various embodiments may conserve resources such as storage and/or bandwidth. In other embodiments, the generated call graph data structures described herein may be utilized for auditing purposes. For example, in the case that the service oriented system provides network-based services (e.g., web services) to consumers of such services (who may provide remuneration for the consumption of services), such consumers may desire to at least occasionally view information that confirms they are being charged in a fair manner. To provide such information to the consumer, various embodiments may include providing the consumer with various records such as records that indicate how frequent they consume network-based services and in what quantity. Such information may be generated based on the call graph data structures described herein.

In one embodiment, the call graph generation logic may receive a first request identifier associated with an inbound service request. The request identifier may include an origin identifier associated with a root request, a depth value specifying a location of the inbound service request within a sequence of service requests, and a request stack including multiple interaction identifiers each assigned to a respective service request issued from one service to another service of multiple services. One example of receiving such a request identifier is illustrated in FIG. 18 as the receipt of inbound service request identifier 2240 by service 2300.

The call graph generation logic may also generate a new request stack. The new request stack may include all of the interaction identifiers of the first request identifier except for an oldest one of the interaction identifiers. For instance, as illustrated in FIG. 18, the request stack of outbound request identifier 2250 does not include "6F," which is the oldest interaction identifier of the inbound service request identifier 2240. The new request stack may also include a new interaction identifier associated with an outbound service request. For instance, as illustrated in FIG. 18, the request stack of outbound service request identifier 2250 includes a new interaction identifier "2C."

The call graph generation logic may also generate a second request identifier associated with the outbound service request. The second request identifier may include the origin identifier, a new depth value specifying a location of the outbound service request within the sequence of service requests, and the new request stack. One example of such a second request identifier is illustrated as outbound service request identifier 2250 of FIG. 18.

In various embodiments, the call graph generation logic may also generate the new depth value such that the new depth value is a result of incrementing the first depth value. For example, in the illustrated embodiment of FIG. 18, the depth value of the outbound request identifier (i.e., "4") may be the result of incrementing the depth value of the inbound request identifier (i.e., "3"). In various embodiments, the call graph generation logic may store either of (or both of) the first request identifier and the second request identifier as log data accessible to one or more computer systems. For instance, in the illustrated embodiment of FIG. 18, the inbound and outbound request identifiers may be stored in inbound request log 2330 and outbound request log 2340, respectively.

For each of the interactions between the services 2500, 2510, 2520, 2530, 2540, 2550, and 250, a request path or downstream path is shown. For each of the interactions between the services 2500, 2510, 2520, 2530, 2540, 2550, and 250, a reply path or upstream path is also shown. In response to each request, the recipient (i.e., downstream) service may send a reply to the requesting (i.e., upstream) service at any appropriate point in time, e.g., after completing the requested operation and receiving replies for any further downstream services called to satisfy the request. A terminal downstream service (i.e., a service that calls no further services) may send a reply to the immediately upstream service upon completion of the requested operation or upon encountering an error that prevents completion of the requested operation. A reply may include any suitable data and/or metadata, such as the output of a requested service in the reply path and/or any error codes or condition codes experienced in the reply path. A reply may also include any suitable element(s) of identifying information from the request stack of the corresponding request, such as the origin identifier and/or interaction identifiers shown in FIG. 16.

Figure 21:
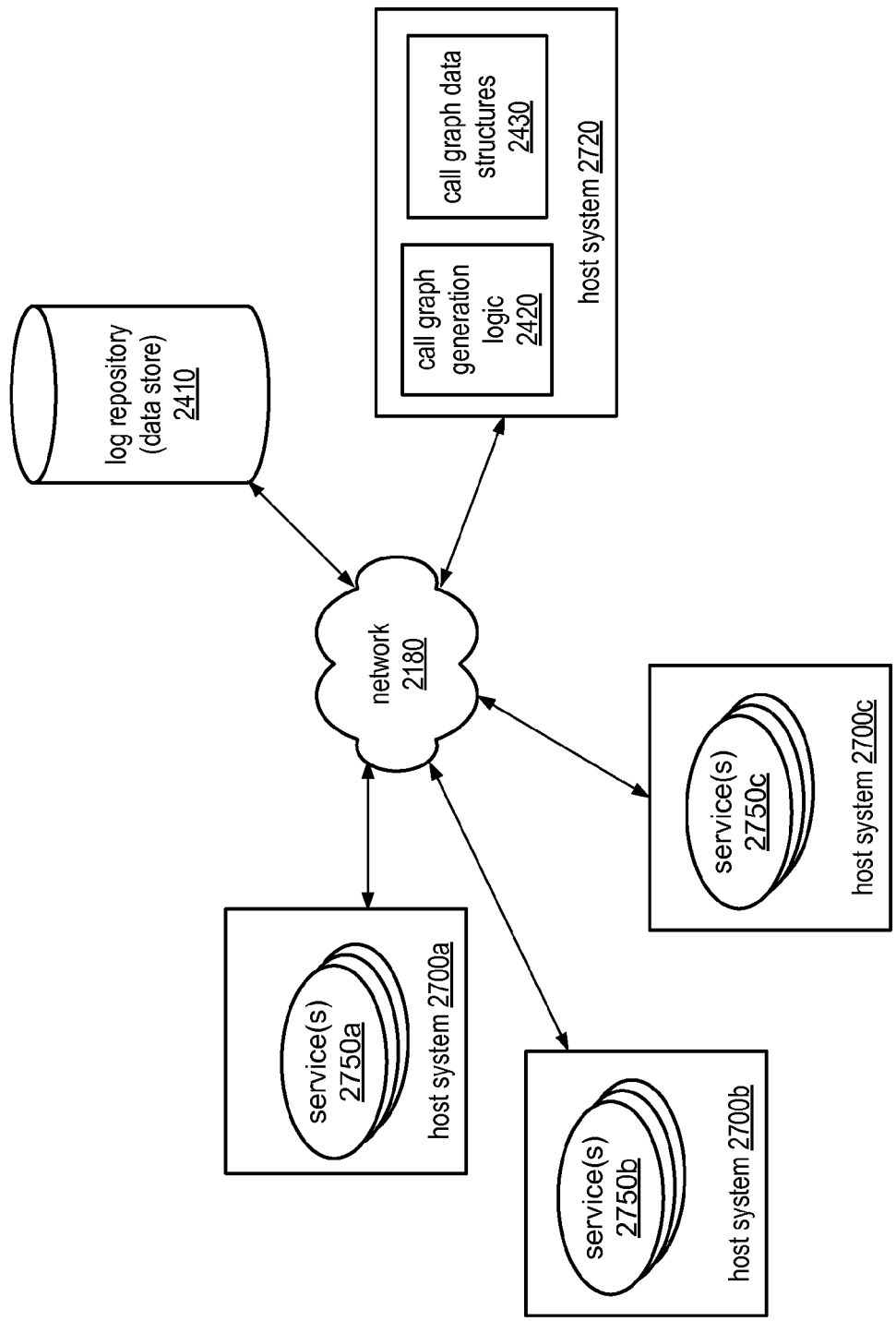
FIG. 21 illustrates an example system configuration for tracking service requests, according to some embodiments.

One example system configuration for tracking service requests is illustrated in FIG. 21. As illustrated, the various components of the example system are coupled together via a network 2180. Network 2180 may include any combination of local area networks (LANs), wide area networks (WANs), some other network configured to communicate data to/from computer systems, or some combination thereof. Each of host systems 2700*a-c* and 2720 may be implemented by a computer system, such as computer system 3000 described below. Call graph generation logic 2420 may be implemented as software (e.g., program instructions executable by a processor of host system 2720), hardware, or some combination thereof. Call graph data structures 2430 may be generated by host system logic 420 and stored in a memory of host system 2720. Log repository 2410 may be implemented as a data store (e.g., database, memory, or some other element configured to store data) coupled to network 2180. In other embodiments, log repository 2410 may be implemented as a backend system of host system 2720 and accessible to host system 2720 via a separate network. Host system 2700*a* may be configured to execute program instruction to implement one or more services 2750*a*. Such services may include but are not limited to one or more of network-based services (e.g., a web service), applications, functions, objects, methods (e.g., objected-oriented methods), subroutines, or any other set of computer-executable instructions. Examples of services 2750 include any of the services described above. Host systems 2700*b-c* and services 2750*b-c* may be configured in a similar manner.

In various embodiments, the various services of the illustrated embodiment may be controlled by a common entity. However, in some embodiments, external systems, such as a system controlled by another entity, may be called as part of a sequence of requests for fulfilling a root request. In some cases, the external system may adhere to the request identifier generation techniques described herein and may integrate with the various services described above. In the event that an external system does not adhere to the various techniques for generating request identifiers as described herein, the external system may be treated as a service that is not visible in the call graph or, alternatively, requests sent back from the external system may be treated as new requests altogether (e.g., as root requests). In various embodiments, the system configuration may include one or more proxy systems and/or load balancing systems. In some cases, the system configuration may treat these systems as transparent from a request identifier generation perspective. In other cases, these systems may generate request identifiers according to the techniques described above.

In some embodiments, the service-oriented system described herein may be integrated with other external systems that may utilize different techniques for identifying requests. For instance, the request identifiers described herein may in various embodiments be wrapped or enveloped in additional data (e.g., additional identifiers, headers, etc.) to facilitate compatibility with various external systems.

Illustrative Computer System

In at least some embodiments, a computer system that implements a portion or all of one or more of the technologies described herein may include a general-purpose computer system that includes or is configured to access one or more computer-readable media. FIG. 22 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 22 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a plurality of computing devices configured to implement a service-oriented system and a trace analysis system, wherein the service-oriented system comprises a plurality of services, and wherein the trace analysis system is configured to:
generate a plurality of routes for a first set of service interactions between individual ones of the plurality of services, wherein the plurality of routes are generated based on a first set of trace data received from the service-oriented system, and wherein the plurality of routes comprise data indicative of call paths for a plurality of node identifiers in the first set of service interactions; and
store data indicative of the plurality of routes;
wherein the service-oriented system is configured to:
generate a sparse trace for a second set of service interactions between individual ones of the plurality of services, wherein the sparse trace comprises a trace identifier and a plurality of node identifiers, and wherein the sparse trace excludes data indicative of call paths for at least some of the second set of service interactions; and
wherein the trace analysis system is configured to:
retrieve the sparse trace from the service-oriented system; and
match the sparse trace to one or more of the plurality of routes, wherein the sparse trace is matched based on the plurality of node identifiers in the sparse trace and the plurality of node identifiers in the plurality of routes.

2. The system as recited in claim 1, wherein, in generating the sparse trace, the service-oriented system is configured to:
activate, at a root node, a sparse tracing mode for the sparse trace; and
send, from the root node to one or more downstream nodes, trace metadata activating the sparse tracing mode for the sparse trace at the one or more downstream nodes.

3. The system as recited in claim 1, wherein, in generating the sparse trace, the service-oriented system is configured to:
activate a sparse tracing mode for the sparse trace, wherein the sparse tracing mode is activated based on analysis of the trace identifier at the individual ones of the plurality of services in the second set of service interactions, wherein the analysis is performed according to a policy shared by the individual ones of the plurality of services in the second set of service interactions.

4. The system as recited in claim 1, wherein the plurality of services are implemented by a plurality of hosts, and wherein the service-oriented system is configured to:
store the first set of trace data using local storage for the plurality of hosts.

5. A computer-implemented method, comprising:
storing data indicative of a plurality of routes for a first set of interactions between individual ones of a plurality of nodes, wherein the plurality of routes comprise data indicative of call paths for a plurality of node identifiers in the first set of interactions;
generating a sparse trace for a second set of interactions between individual ones of the plurality of nodes, wherein the sparse trace comprises a plurality of node identifiers in the second set of interactions; and
matching the sparse trace to one or more of the plurality of routes, wherein the sparse trace is matched based on the plurality of node identifiers in the sparse trace and the plurality of node identifiers in the plurality of routes.

6. The method as recited in claim 5, wherein the sparse trace excludes data indicative of call paths for at least some of the second set of interactions.

7. The method as recited in claim 5, wherein the sparse trace comprises a trace identifier, and wherein the plurality of node identifiers in the sparse trace are determined using the trace identifier.

8. The method as recited in claim 5, wherein generating the sparse trace comprises:
   activating, at a root node, a sparse tracing mode for the sparse trace; and
   sending, from the root node to one or more downstream nodes, trace metadata activating the sparse tracing mode for the sparse trace at the one or more downstream nodes.

9. The method as recited in claim 5, wherein the sparse trace comprises a trace identifier, and wherein generating the sparse trace comprises:
   activating a sparse tracing mode for the sparse trace, wherein the sparse tracing mode is activated based on analysis of the trace identifier at the individual ones of the plurality of nodes in the second set of interactions, wherein the analysis is performed according to a policy shared by the individual ones of the plurality of nodes in the second set of interactions.

10. The method as recited in claim 5, wherein the plurality of routes are determined based on a set of trace events generated for the first set of interactions, and wherein the method further comprises:
    storing the set of trace events using persistent storage at individual ones of the nodes at which the respective trace events were generated.

11. The method as recited in claim 5, wherein the method further comprises:
    storing data indicative of the sparse trace using persistent storage at individual ones of the nodes in the second set of interactions.

12. The method as recited in claim 5, further comprising:
    receiving user input representing a request to perform interaction reconstruction for the sparse trace, wherein the sparse trace is matched to one or more of the plurality of routes in response to the request.

13. A non-transitory computer-readable storage medium storing program instructions computer-executable to perform:
    generating data indicative of a plurality of routes for a first set of service interactions between individual ones of a plurality of services in a service-oriented system, wherein the plurality of routes comprise data indicative of call paths for a plurality of node identifiers in the first set of service interactions;
    generating a sparse trace for a second set of service interactions between individual ones of the plurality of services, wherein the sparse trace comprises a plurality of node identifiers in the second set of service interactions; and
    matching the sparse trace to one or more of the plurality of routes, wherein the sparse trace is matched based on the plurality of node identifiers in the sparse trace and the plurality of node identifiers in the plurality of routes.

14. The non-transitory computer-readable storage medium as recited in claim 13, wherein the sparse trace excludes data indicative of call paths for at least some of the second set of service interactions.

15. The non-transitory computer-readable storage medium as recited in claim 13, wherein the sparse trace comprises a trace identifier, and wherein the plurality of node identifiers in the sparse trace are determined using the trace identifier.

16. The non-transitory computer-readable storage medium as recited in claim 13, wherein generating the sparse trace comprises:
    activating, at a root node, a sparse tracing mode for the sparse trace; and
    sending, from the root node to one or more downstream nodes, trace metadata activating the sparse tracing mode for the sparse trace at the one or more downstream nodes.

17. The non-transitory computer-readable storage medium as recited in claim 13, wherein the sparse trace comprises a trace identifier, and wherein generating the sparse trace comprises:
    activating a sparse tracing mode for the sparse trace, wherein the sparse tracing mode is activated based on analysis of the trace identifier at the individual ones of the plurality of services in the second set of service interactions, wherein the analysis is performed according to a policy shared by the individual ones of the plurality of services in the second set of service interactions.

18. The non-transitory computer-readable storage medium as recited in claim 13, wherein the plurality of services are implemented by a plurality of hosts, wherein the plurality of routes are determined based on a set of trace events generated by the service-oriented system for the first set of service interactions, and wherein the program instructions are further computer-executable to perform:
    storing the set of trace events using persistent storage at individual ones of the hosts at which the respective trace events were generated.

19. The non-transitory computer-readable storage medium as recited in claim 13, wherein the plurality of services are implemented by a plurality of hosts, and wherein the program instructions are further computer-executable to perform:
    storing data indicative of the sparse trace using persistent storage at individual ones of the hosts in the second set of service interactions.

20. The non-transitory computer-readable storage medium as recited in claim 13, wherein the program instructions are further computer-executable to perform:
    receiving user input representing a request to perform interaction reconstruction for the sparse trace, wherein the sparse trace is matched to one or more of the plurality of routes in response to the request.

* * * * *